US010311754B2

(12) United States Patent
Baker et al.

(10) Patent No.: US 10,311,754 B2
(45) Date of Patent: Jun. 4, 2019

(54) RESETTABLE AUTO INJECTOR TRAINING DEVICE WITH A RELEASABLY LOCKING SHIELD AND A RESETTING CAP

(71) Applicant: NOBLE INTERNATIONAL, INC., Orlando, FL (US)

(72) Inventors: Jeff Baker, Orlando, FL (US); Hou Shi Shuang, NingBo (CN); Christopher Chung, Orlando, FL (US); Francis Michael Siemer, Orlando, FL (US)

(73) Assignee: JBCB HOLDINGS, LLC, Orlando, FL (US)

(*) Notice: Subject to any disclaimer, the term of this patent is extended or adjusted under 35 U.S.C. 154(b) by 0 days.

(21) Appl. No.: 15/626,842

(22) Filed: Jun. 19, 2017

(65) Prior Publication Data

US 2017/0352293 A1 Dec. 7, 2017

Related U.S. Application Data

(63) Continuation of application No. PCT/US2016/050827, filed on Sep. 8, 2016, which is
(Continued)

(51) Int. Cl.
*G09B 23/28* (2006.01)

(52) U.S. Cl.
CPC .................. *G09B 23/285* (2013.01)

(58) Field of Classification Search
USPC ........ 434/262, 267, 268, 272; 604/134, 135, 604/192–196
See application file for complete search history.

(56) References Cited

U.S. PATENT DOCUMENTS

| 3,426,448 A * | 2/1969 | Sarnoff ................ G09B 23/285 434/262 |
| 5,071,353 A * | 12/1991 | van der Wal ....... A61M 5/2033 434/262 |

(Continued)

FOREIGN PATENT DOCUMENTS

| EP | 2784766 | 10/2014 |
| KR | 10-2012-0107752 | 10/2012 |

OTHER PUBLICATIONS

International Search Report and Written Opinion for PCT Application PCT/US16/050827 dated Jan. 24, 2017, pp. 1-15.
(Continued)

*Primary Examiner* — Kurt Fernstrom
(74) *Attorney, Agent, or Firm* — Timothy H. Van Dyke; Beusse, Wolter, Sanks & Maire PLLC

(57) ABSTRACT

A resettable injection training device having an outer shell including a proximal end and a distal end, the outer shell defining a chamber there within, an actuation member near a proximal end, and a plunger slidable within the chamber is provided in an embodiment herein. The embodiment further including a safety shield having an extended locked position, an extended unlocked position and a retracted position, a locking sleeve configured to interact with the safety shield, and a reset shuttle disposed within the safety shield at a distal end of the device, wherein the reset shuttle is slidable relative to the safety shield, such that movement of the reset shuttle toward the proximal end of the device unlocks the safety shield.

21 Claims, 32 Drawing Sheets

Related U.S. Application Data a continuation of application No. 14/847,247, filed on Sep. 8, 2015, now Pat. No. 9,911,364.

(56) References Cited

U.S. PATENT DOCUMENTS

| | | | | |
|---|---|---|---|---|
| 5,567,160 | A * | 10/1996 | Massino | G09B 23/285 |
| | | | | 434/262 |
| 7,682,155 | B2 * | 3/2010 | Raven | G09B 23/285 |
| | | | | 434/262 |
| 8,714,984 | B2 * | 5/2014 | Mach | A61M 5/20 |
| | | | | 434/267 |
| 9,336,690 | B2 * | 5/2016 | Helmer | G09B 23/285 |
| 9,443,445 | B2 * | 9/2016 | Laurusonis | G09B 23/285 |
| 9,489,868 | B2 * | 11/2016 | Smith | G09B 23/285 |
| 2007/0111175 | A1 | 5/2007 | Raven et al. | |
| 2008/0059133 | A1 * | 3/2008 | Edwards | G06Q 10/00 |
| | | | | 703/7 |
| 2008/0249477 | A1 * | 10/2008 | Paproski | A61M 5/326 |
| | | | | 604/198 |
| 2012/0040320 | A1 * | 2/2012 | Nadeau | G09B 23/285 |
| | | | | 434/262 |
| 2013/0236872 | A1 | 9/2013 | Laurusonis et al. | |
| 2015/0037772 | A1 * | 2/2015 | Julian | A61M 5/2033 |
| | | | | 434/262 |
| 2015/0235571 | A1 * | 8/2015 | Alexandersson | G09B 23/285 |
| | | | | 434/262 |

OTHER PUBLICATIONS

"Enbrel Instructions for Use", https://pi.amgen.com/~/media/amgen/repositorysites/pi-amgen-com/enbrel/enbrel_piu.pdf, 2018, 48 pages.

\* cited by examiner

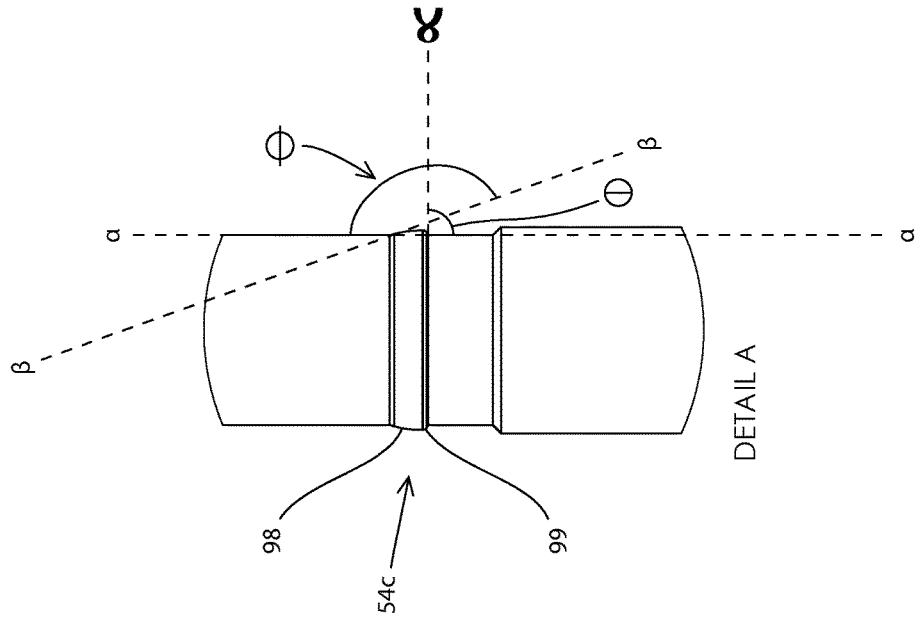
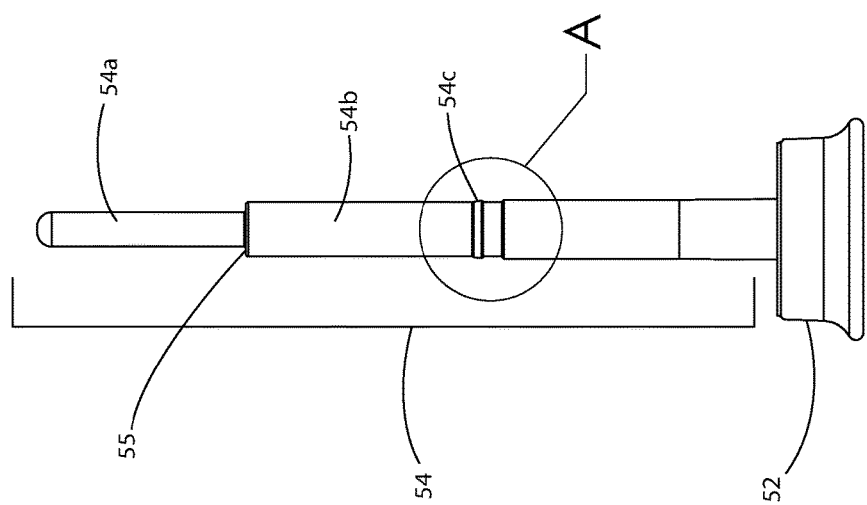
Fig. 10b
Fig. 10a

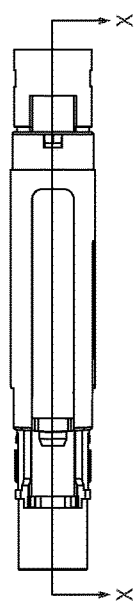
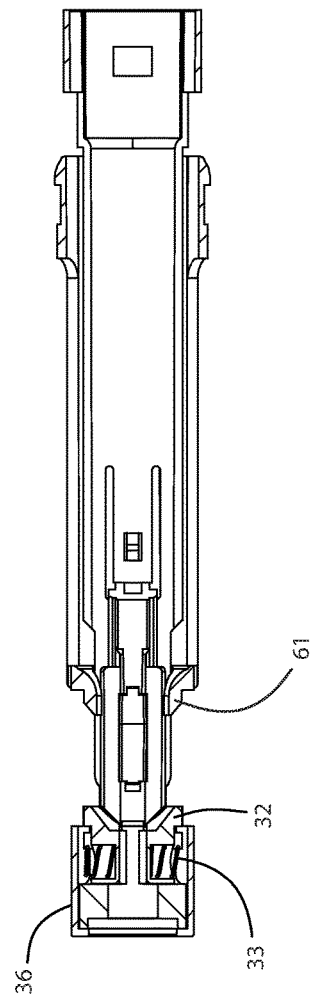
Fig. 11
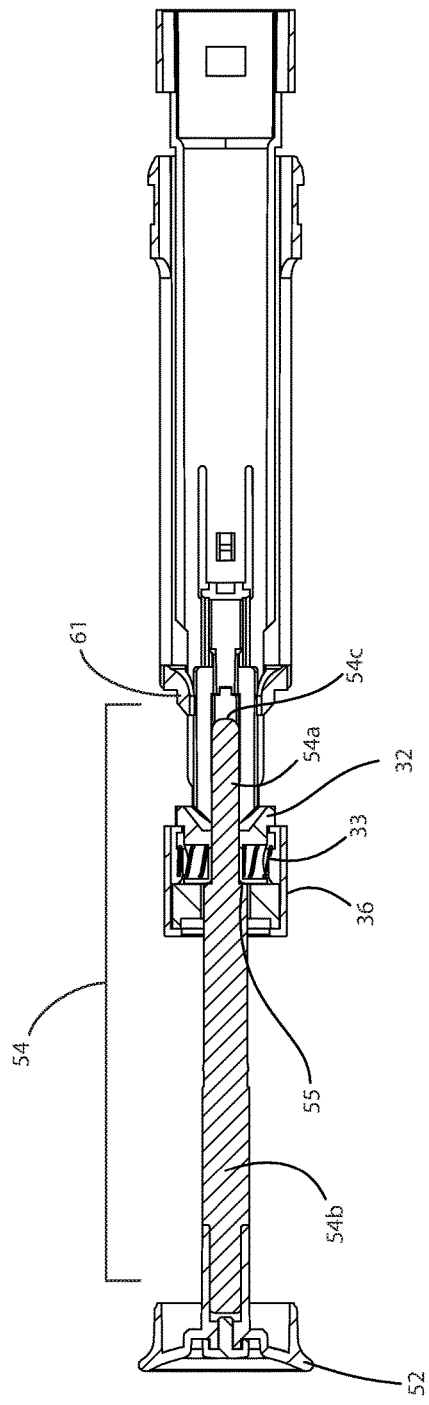
Fig. 12

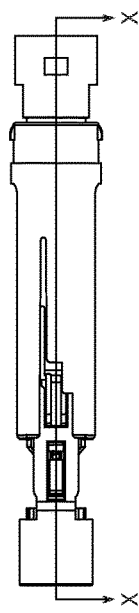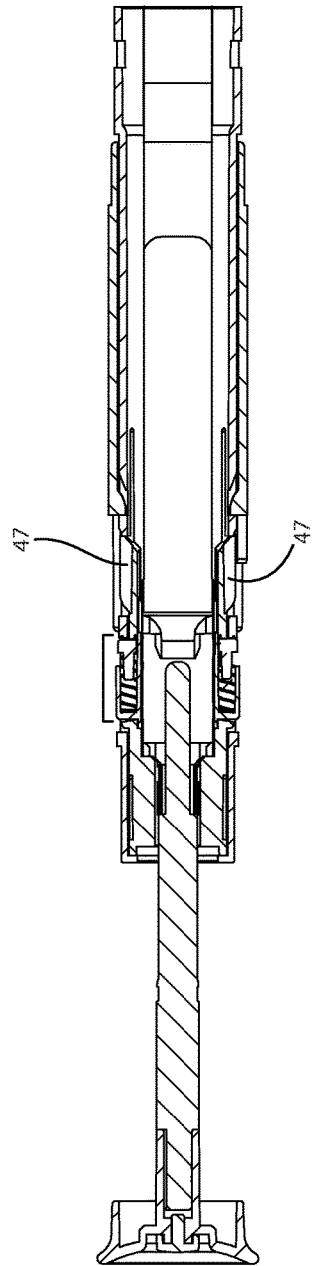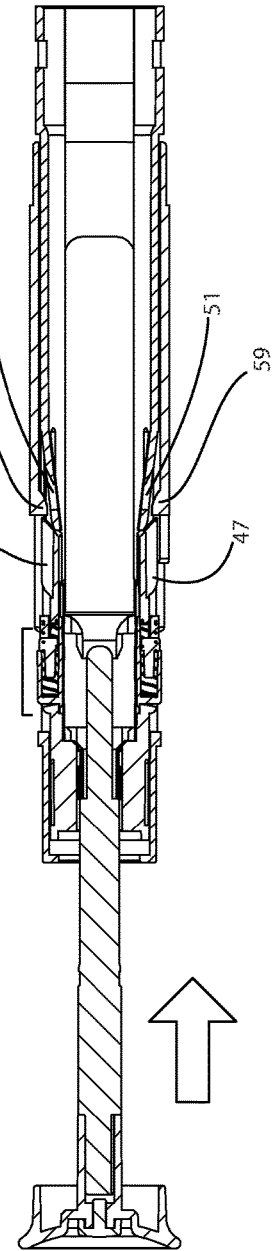
Fig. 13
Fig. 14a

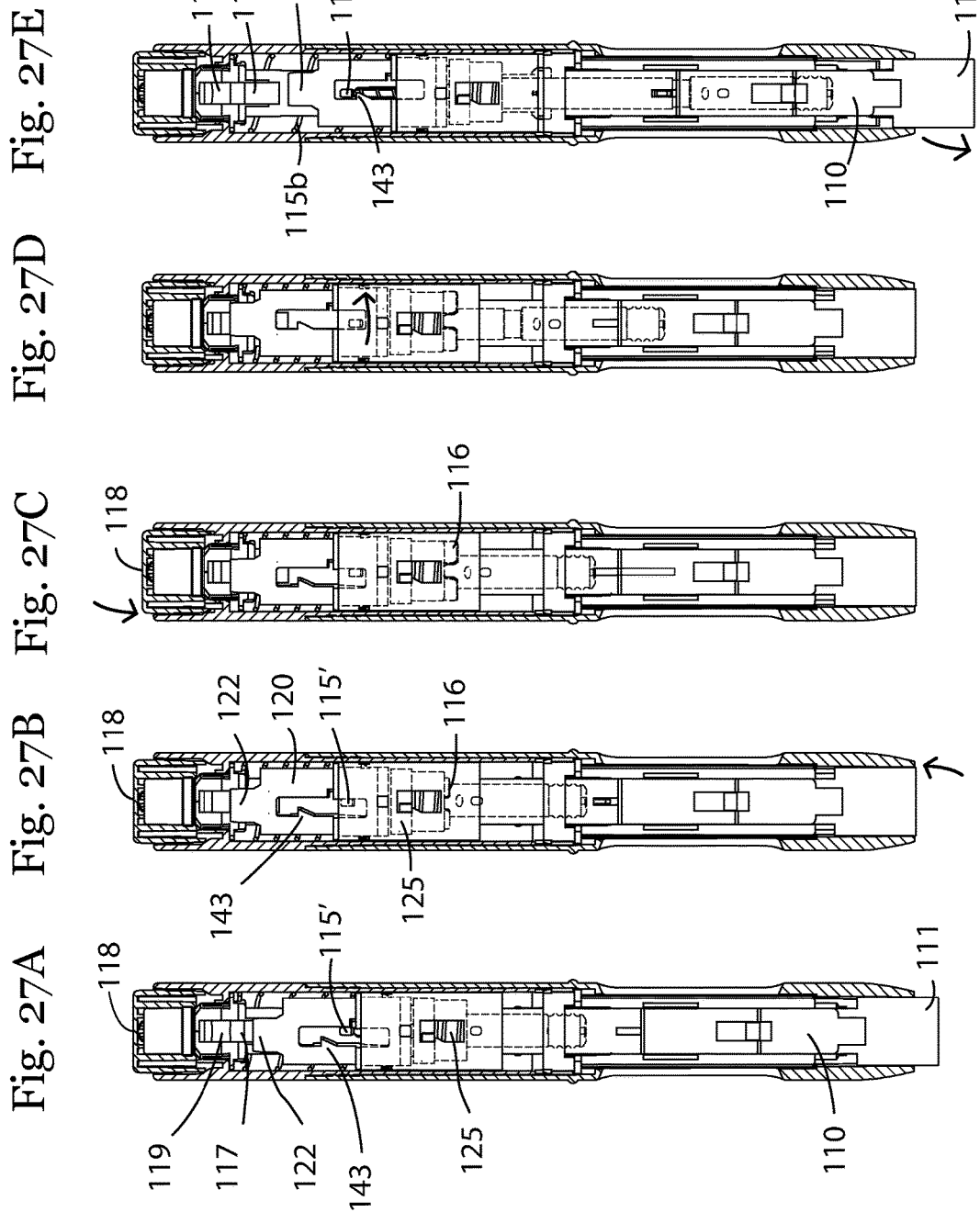

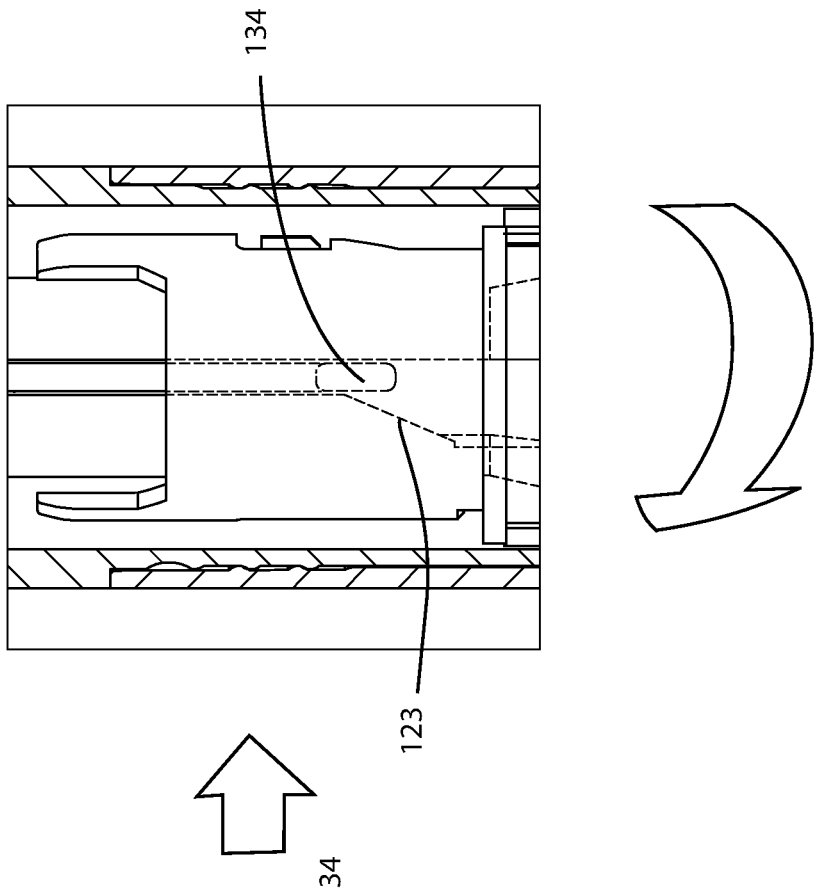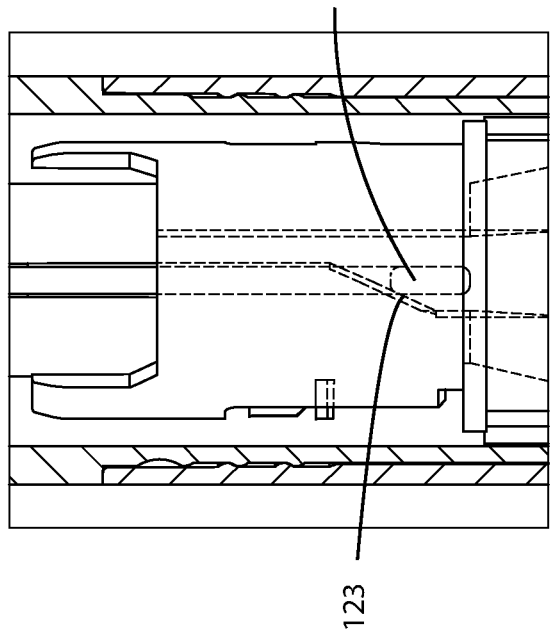

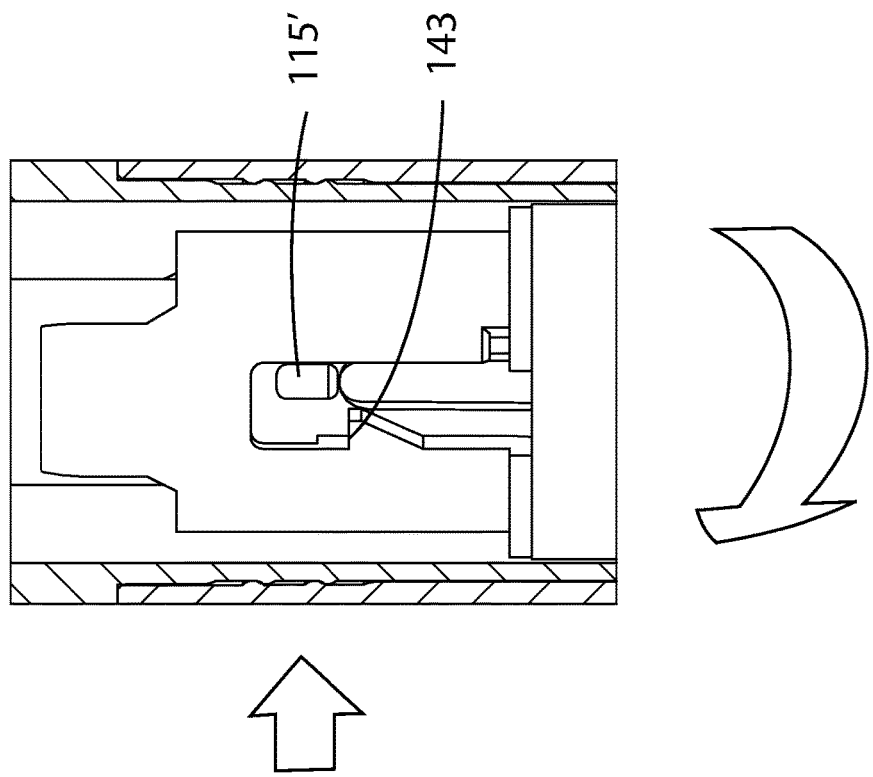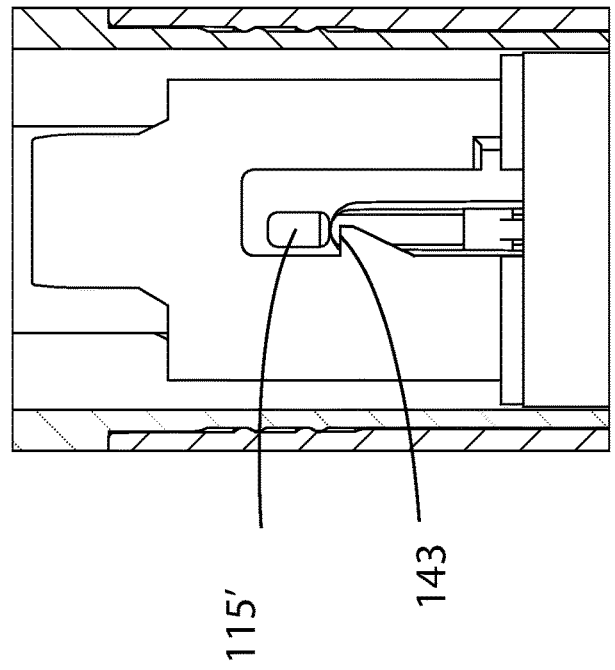

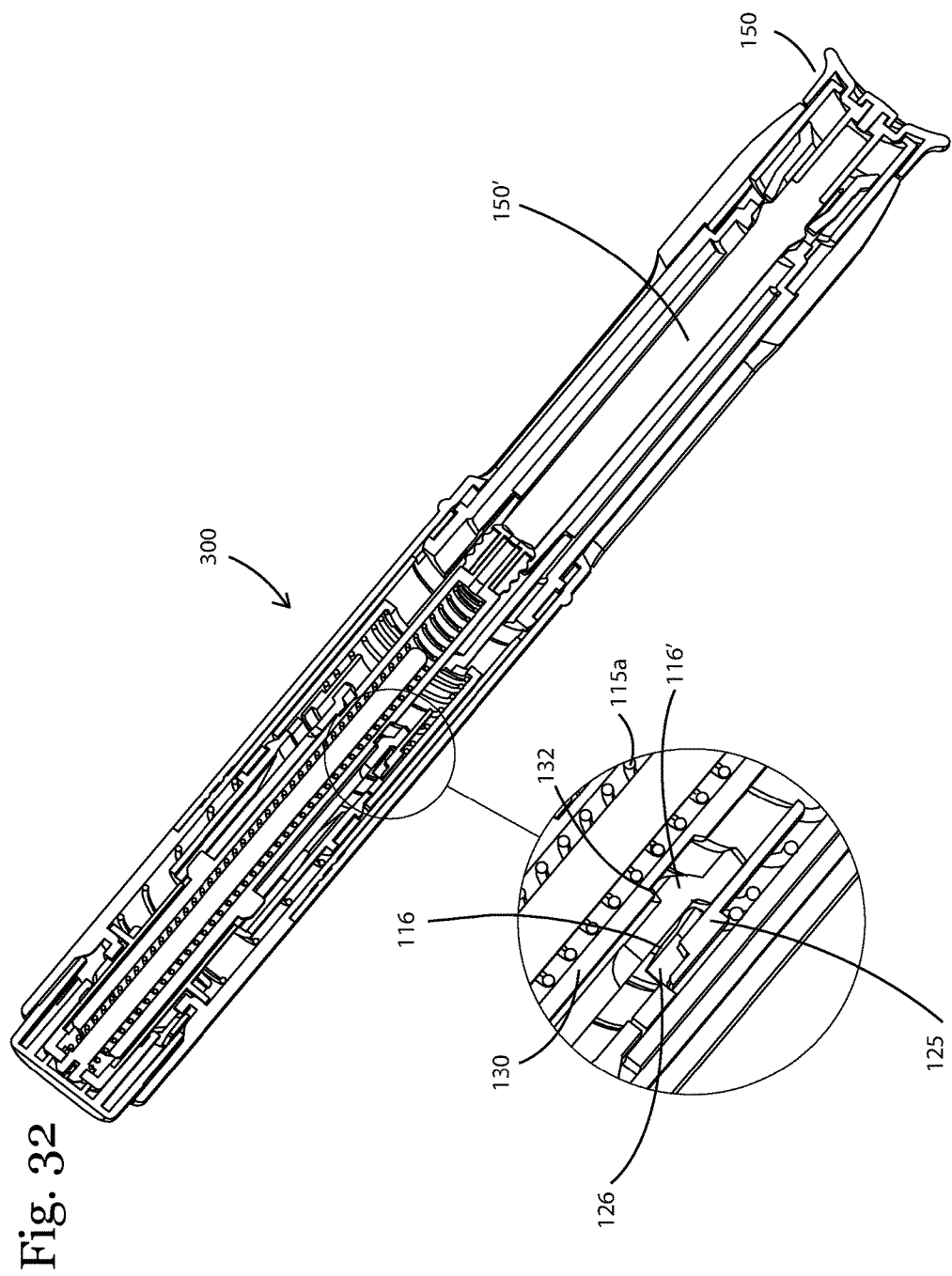

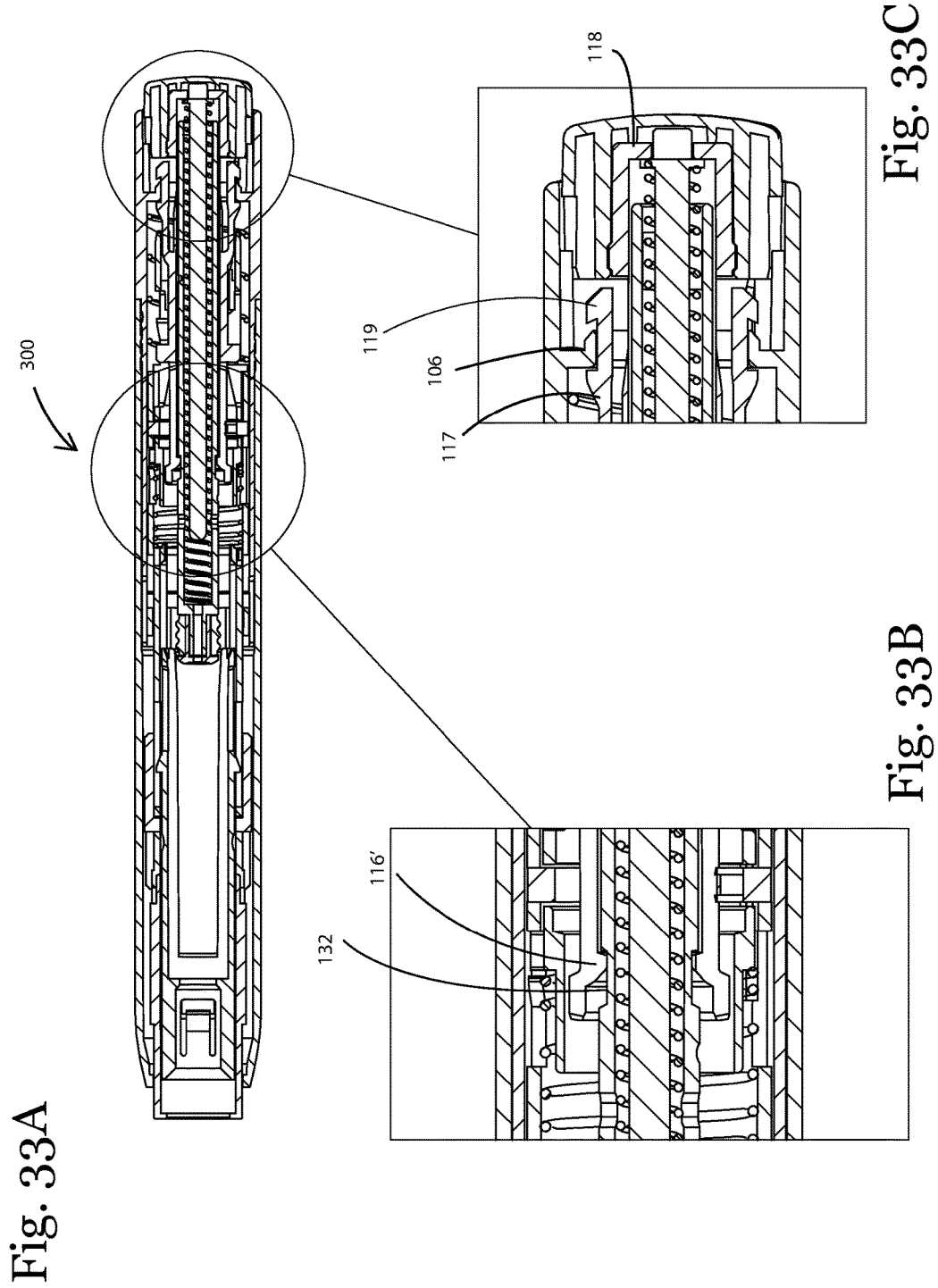

RESETTABLE AUTO INJECTOR TRAINING DEVICE WITH A RELEASABLY LOCKING SHIELD AND A RESETTING CAP

CROSS-REFERENCE TO RELATED APPLICATIONS

This application claims priority to U.S. patent application Ser. No. 14/847,247 filed on Sep. 8, 2015.

BACKGROUND

Injection devices have recently become increasingly popular for single dose or multi-dose, at home self-administration. These devices include both auto-injection devices and pre-filled syringe devices, and are often designed to accomplish two basic objectives: convenience of drug delivery in an outpatient or at home setting, and/or automation of drug delivery in an outpatient or at-home setting.

Injectable medications are required for a number of varying illnesses and diseases. A number of injectable medications require self-injection by a patient. Self-injection of a medicament using a device having a needle carries with it a certain stigma. Oftentimes patients are weary of injecting themselves for fear or anxiety related to failing to receive a complete dose of the medication, pain associated with injecting oneself with the needle, accidentally sticking oneself with the needle, and difficulties in adequately grasping the dosing mechanism to inject oneself, among other concerns. These fears and anxieties associated with the currently available self-injection devices may result in the administration of an incomplete dose of a medicament, failure to administer any portion of the dose of a medicament, or accidentally sticking oneself with the needle of the device, which in some instances could lead to unwanted transmission of diseases if the needle is contaminated.

An additional concern exists with regard to injection devices is that users with little or no medical knowledge or experience are injecting themselves or injecting others using these devices. Performing a medical treatment or test on oneself or others carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing the anxiety associated with medicament delivery. Safe use and re-use of these training devices requires a resettable device. Therefore, a device which allows repeated practice and ease of use to enhance familiarity with the injection device and the self-injection process, along with the ability to safely and efficiently reset the device is paramount to an effective device for injection training.

SUMMARY

A resettable injection training device having a an outer shell including a proximal end and a distal end, the outer shell defining a chamber there within, an actuation member near a proximal end, and a plunger slidable within the chamber is provided in an embodiment herein. The device further including a safety shield having an extended locked position, an extended unlocked position and a retracted position, a locking sleeve configured to interact with the safety shield, and a reset shuttle disposed within the safety shield at a distal end of the device, wherein the reset shuttle is slidable relative to the safety shield, such that movement of the reset shuttle toward the proximal end of the device unlocks the safety shield.

In another embodiment, a resettable injection training device includes an outer shell having a proximal end and a distal end, the outer shell defining a chamber there within, an actuation member near a proximal end, and a plunger slidable within the chamber, a safety shield having an extended locked position, an extended unlocked position and a retracted position, the safety shield comprising a safety shield locking tab, said tab comprising a locking tab opening, a locking sleeve configured to surround the safety shield, said locking sleeve including one or more protrusions configured to interact with the locking tab opening when the safety shield is in an extended locked position, a reset shuttle disposed within the safety shield at a distal end of the device, wherein the reset shuttle is slidable relative to the safety shield, such that movement of the reset shuttle toward the proximal end of the device unlocks the safety shield, a cap comprising a cap end and an elongate rod comprising an interfacing surface, wherein contact between the interfacing surface of the elongate rod and the reset shuttle slides the reset shuttle relative to the safety shield to unlock the safety shield.

In still another embodiment, a method for resetting an injection training device having an outer shell defining a chamber, the device including an actuation assembly outer housing and an actuation assembly inner housing slidable relative to one another, the actuation assembly inner housing comprising one or more flexible prongs at a proximal end of the device configured to lock an actuation mechanism, a plunger slidable within the chamber, a locking safety shield movable between an extended position and a retracted position, a locking sleeve configured to interact with the safety shield, a reset shuttle disposed within a distal end of the safety shield and slidable relative there to, and a cap comprising an elongate rod for resetting the device, wherein when the safety shield is in an extended locked position, wherein insertion of the elongate rod into the chamber slides the reset shuttle relative to the safety shield, unlocking the safety shield for a subsequent use.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 10A-B is a side view of a cap according to an embodiment of the invention, and a sectional view of an elongate rod portion of the cap of FIG. 10A, respectively.

FIG. 11 is a sectional cross sectional view of the embodiment of FIG. 7 in an actuated position with a locked shield.

FIG. 12 is a sectional cross sectional view of the embodiment of FIG. 11 with a cap in a first reset position.

FIG. 13 is a sectional cross sectional view of the embodiment of FIG. 11 with a cap in a first reset position, wherein the device is rotated 90 degrees from the view in FIG. 12.

FIG. 14A is a sectional cross sectional view of the embodiment of FIG. 13 with a cap in a second reset position.

FIGS. 27A-E are cut away views illustrating the action of internal components of an embodiment of the resettable injection training device of FIG. 22A-B.

FIGS. 30A-B are partial cross sectional views of an embodiment of the resettable injection training device of FIG. 22A-B during reset.

FIGS. 31A-B are partial cross sectional views of an embodiment of the resettable injection training device of FIG. 22A-B during reset.

FIG. 32 is a longitudinal cross-sectional view of an embodiment of the resettable injection training device of FIG. 22A-B.

FIG. 33A is a cross sectional view of an embodiment of the resettable injection training device of FIG. 22A-B.

FIG. 33B-33C show close up partial, cross sectional views of portions of the embodiment shown in FIG. 33A.

DETAILED DESCRIPTION

Figure 1:
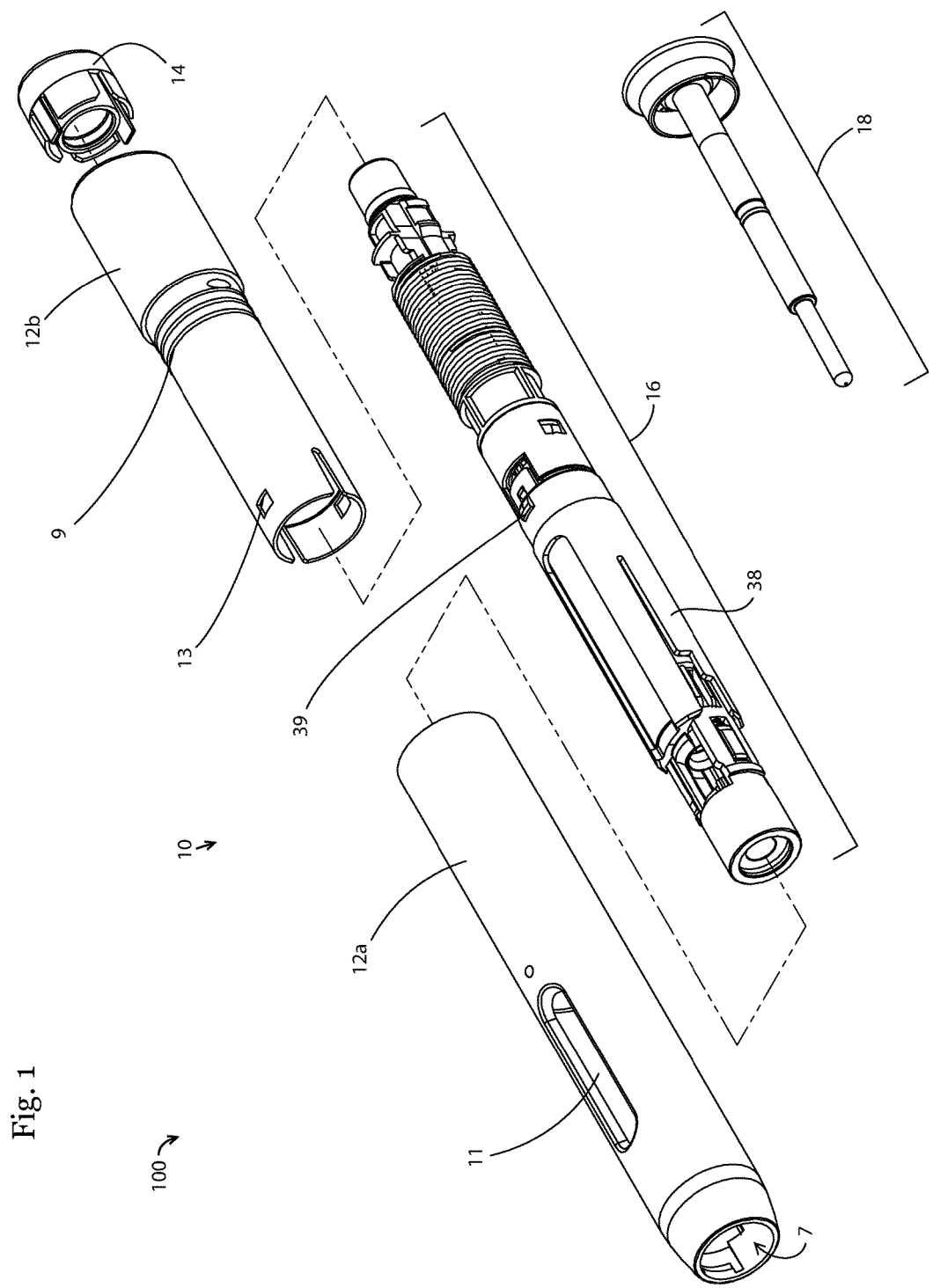
FIG. 1 is an exploded view of components of an embodiment of a resettable injection training device.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another. The modifier "about" used in connection with a quantity is inclusive of the stated value and has the meaning dictated by the context. It is to be noted that all ranges disclosed within this specification are inclusive and are independently combinable.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. As another non-limiting example, a range of "between 20 and 10" can also include the values 20, 10.

The term "adjacent" as used herein, includes but is not limited to near, associated with, or in close proximity to.

In certain embodiments herein, an actuation member is described as being in a locked and an unlocked position. In its locked position, the actuation member may still be movable and compressible; however, compression of the actuation member will not affect actuation of the device. In the unlocked position, the actuation member may be compressed to actuate the device. Therefore, when the actuation member is in the unlocked position, activation of the actuation member may actuate the device.

The inventors herein have identified a need for a device to be used in effectively training patients to use a needle-containing injection device, particularly when these injection devices are used for at home or outpatient environments. In the field of medicament injection training devices, correct injection of medicament by way of the injection device is crucial for obtaining accurate doses of medicament contained therein. Factors such as a fear of needles, fear of pain associated with an injection, inexperience with injection devices and delivering injections, and unfamiliarity with injection devices and their operation, among other factors can contribute to issues in administering the medicament correctly with the injection device. Consequently, patient training in correct operation of the injection device is crucial to reducing patient anxiety and enhancing patient compliance. In one embodiment, a resettable injection training device is provided herein.

Turning to the Figures, FIG. 1 is an exploded view of components of an embodiment 100 of a resettable injection training device 10 including an outer shell 12 having a lower outer shell portion 12a, an upper outer shell portion 12b, and an actuation member 14 configured to associate at a proximal end of the outer shell 12. The outer shell 12 defines a chamber 7. FIG. 1 shows a perspective view of an internal mechanical assembly 16 of the device 10, and a cap 18. In FIG. 1, a locking sleeve interacting tab 39 can be found on a locking sleeve 38 of the internal mechanical assembly 16. The locking sleeve interacting tab 39 is configured to interact with a locking sleeve interacting slot 13 on the outer shell 12, such that when the locking sleeve interacting tab 39 is engaged within the locking sleeve interacting slot 13, the locking sleeve 38 is stationary relative to the upper outer shell 12b. A viewing window 11 is shown in the lower outer shell portion 12a allowing a user to view into and/or through the device 10.

Further shown in FIG. 1 are upper outer shell interacting ribs 9 of the upper outer shell 12b, which are configured to interact with an inner surface of the lower outer shell 12a, to affix upper outer shell 12b to lower outer shell 12a, in a non-limiting embodiment, when the device embodiment 100 is assembled. The upper outer shell and lower outer shell 12b, 12a, respectively, may alternatively be affixed to one another in a variety of ways, including but not limited to a friction fit interaction between the two components, a tab and opening interaction between the two components, wherein a tab on either the upper or lower outer shell interacts with a tab on the other of the upper or lower shell, or joined by another method such as ultrasonic welding, an adhesive, or any other such method known to those skilled in the art.

Figure 2:
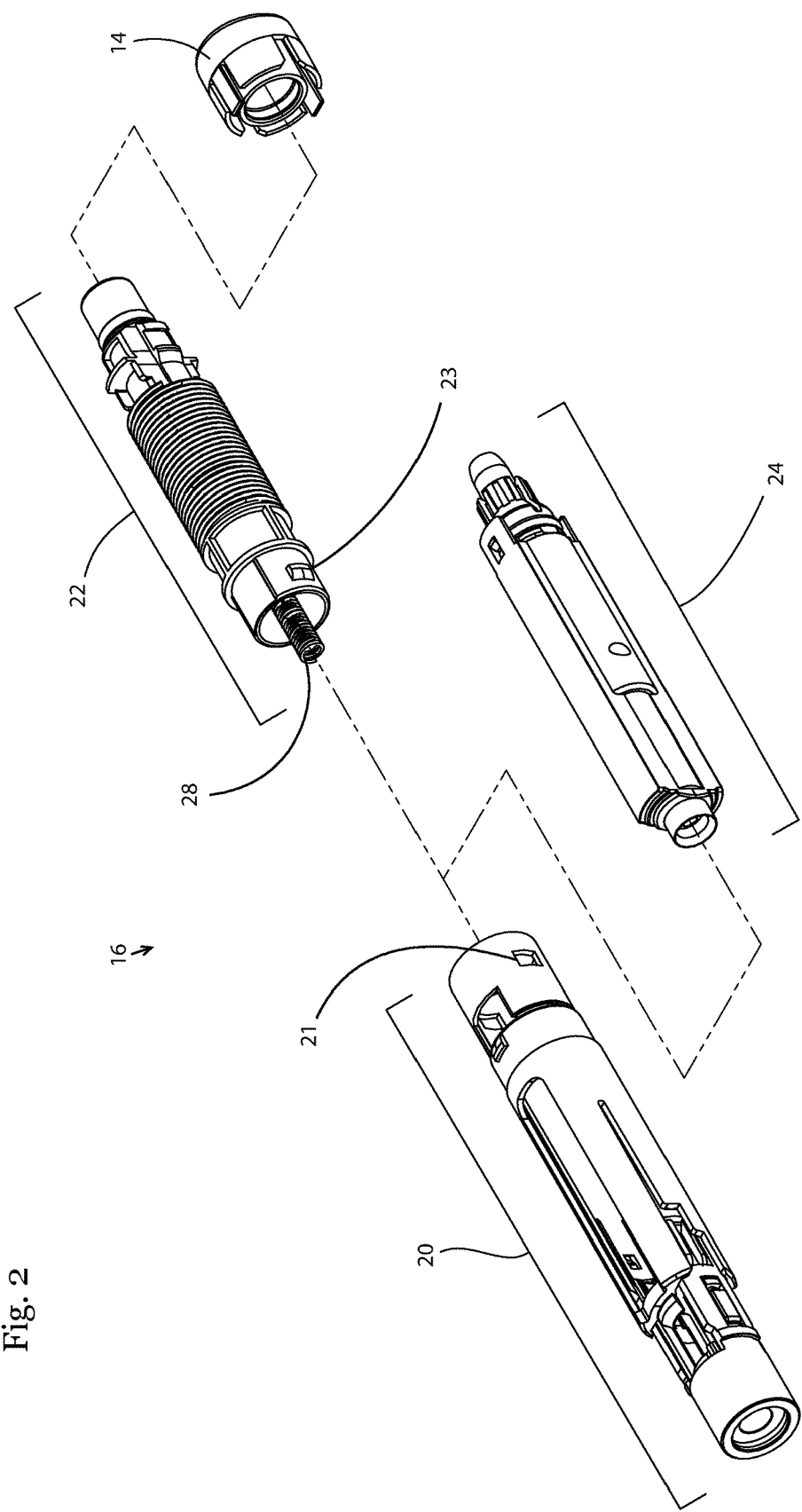
FIG. 2 is an exploded view of an internal mechanical assembly embodiment of the resettable injection training device of FIG. 1.

FIG. 2 is an exploded view of the internal mechanical assembly 16 including a safety shield reset assembly 20 having a safety shield interaction opening 21, a plunger actuator mechanism assembly 22 with a plunger spring 28 and a safety shield interaction tab 23 configured to interact with the safety shield interaction opening 21 when the internal mechanical assembly 16 is assembled. The internal mechanical assembly 16 further includes a medication simulator window assembly 24 and the actuation member 14 (previously shown in FIG. 1).

Figure 3:
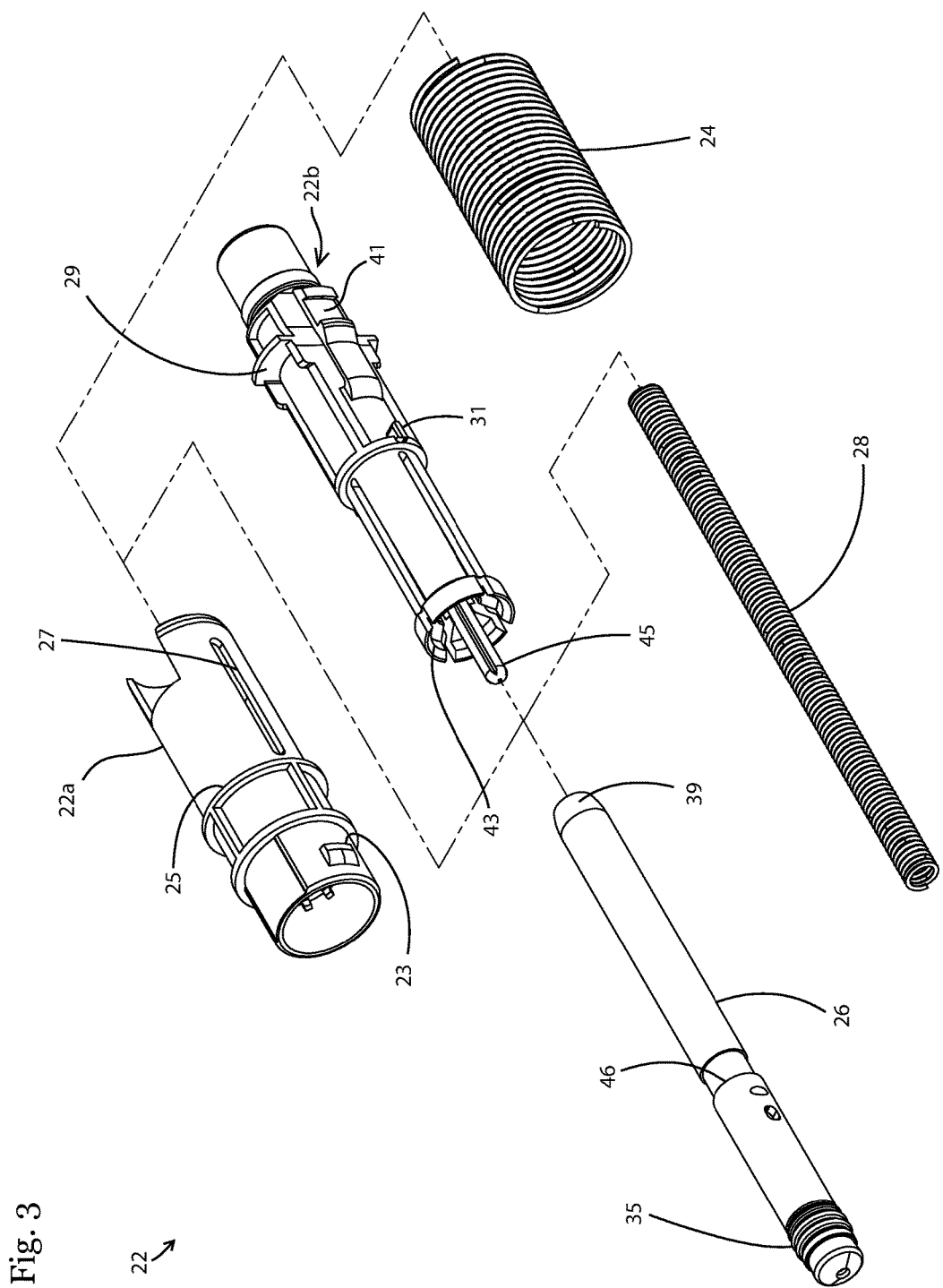
FIG. 3 is an exploded view of the plunger actuator mechanism assembly of the embodiment of the resettable injection training device of FIG. 1.

FIG. 3 is an exploded view of the plunger actuator mechanical assembly 22, showing a lower plunger actuator mechanical assembly portion 22a having a plunger reset spring proximal stop portion 25 and the safety shield interlocking tab 23 shown in FIG. 2. The lower plunger actuator mechanical assembly portion 22a may further include a rotation-limiting slot 27. The plunger actuator mechanical assembly may further include an upper plunger actuator mechanical assembly portion 22b, including a plunger reset spring distal stop anti-rotational limiting tab 29 and a rotation limiting tab 31 for engaging with the rotation limiting slot 27 to prevent rotation of the lower plunger actuator mechanical assembly portion 22a relative to the upper plunger actuator mechanical assembly portion 22b when the components are assembled together. The upper plunger actuator mechanical assembly portion 22b further includes an actuation unlocking tab 41, plunger locking teeth 43, and a plunger spring guide 45 for associating with a plunger spring 28. A plunger reset spring 24 is configured to be disposed between the plunger reset spring proximal and distal stops 25, 29, respectively. A plunger 26 having a proximal end 39 and a distal end 35 and a plunger reset groove 46.

Figure 4:
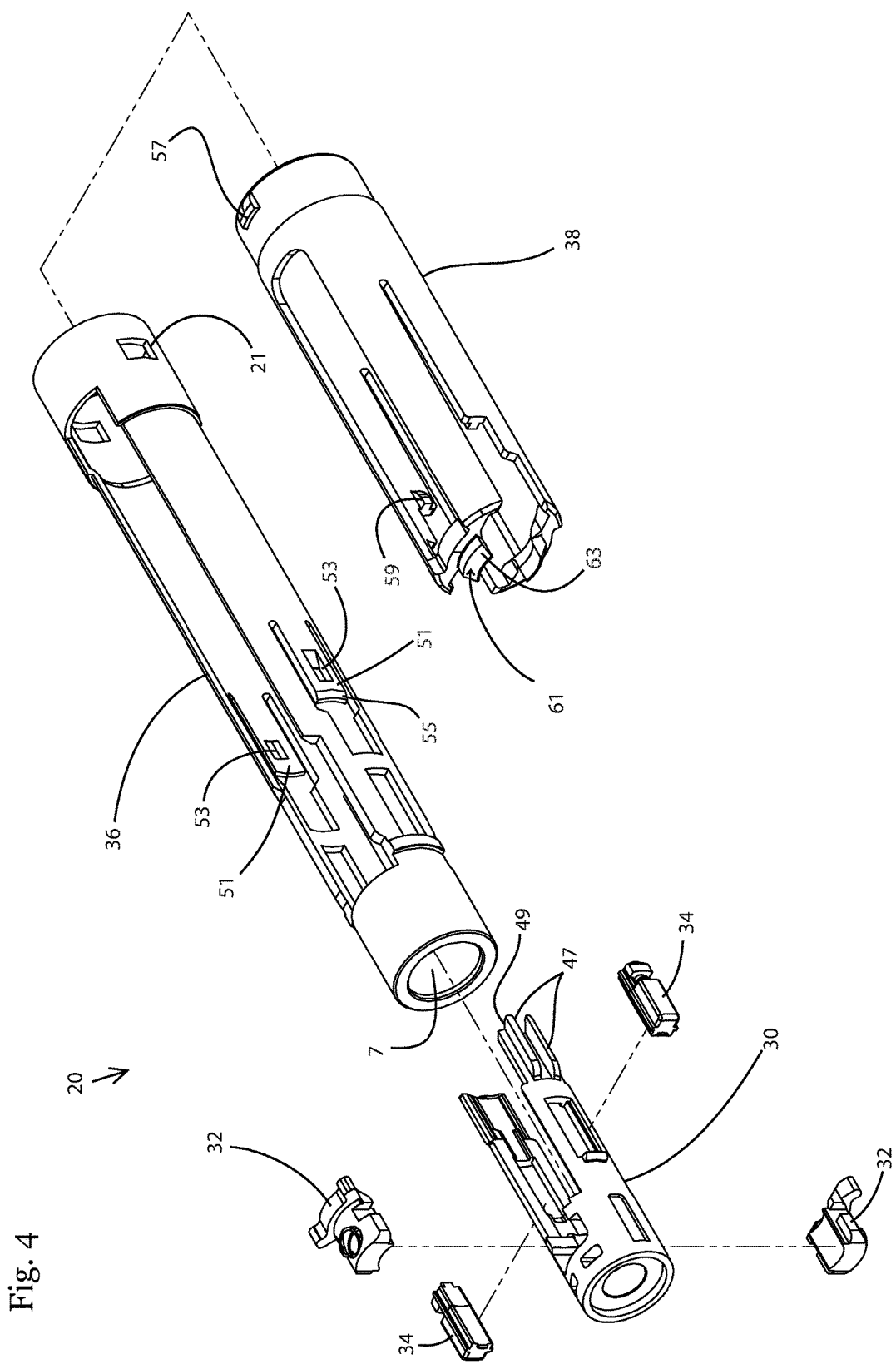
FIG. 4 is an exploded view of a safety shield reset assembly of the embodiment of the resettable injection training device of FIG. 3.

FIG. 4 is an exploded view of the safety shield reset assembly 20 having an unlock shuttle 30, including sliding blocks 32, guiding pillars 34, safety shield 36, and a locking sleeve 38. The reset shuttle 30 includes at least one reset tooth 47, each reset tooth having a tab interfacing surface 49, the reset shuttle 30 is configured to move relative to the safety shield 36, wherein when the reset shuttle moves in a proximal direction relative to the device and relative to the safety shield 36 to unlock and reset the device. The safety shield 36 further defines the chamber 7, and includes a safety shield locking tab 51 having a locking tab opening 53 and a tooth interfacing surface 55. The safety shield 36 further includes a safety shield interaction opening 21 for receiving the safety shield interaction tab 23 on the plunger actuator mechanism assembly 22 (see FIG. 2). The locking sleeve 38 includes a locking sleeve interacting tab 39 for interacting with the locking sleeve interacting slot 13 of the outer shell 12, such that the locking sleeve 38 may be secured to the outer shell 12 to prevent movement there between. The locking sleeve 38 also includes a safety lock protrusion 59 for interacting with the locking tab opening 53 on the safety shield 36 when the safety shield is in an extended locked position to prevent sliding of the safety shield 36 relative to the outer shell 12. Interaction between the reset tooth (or teeth) 47 and the safety shield locking tab 51 as the reset shuttle 30 is moved in a proximal direction relative to the safety shield 36, causes the safety shield locking tab 51 to bias inward, to release the safety lock protrusion 59 from the locking tab opening 53 to allow the safety shield to be reset from an extended locked position to an unlocked position. Locking sleeve further includes a sliding block rib 61 for interaction with the sliding block 32 (shown in FIGS. 5a-5b) during reset of the device.

Figure 5B:
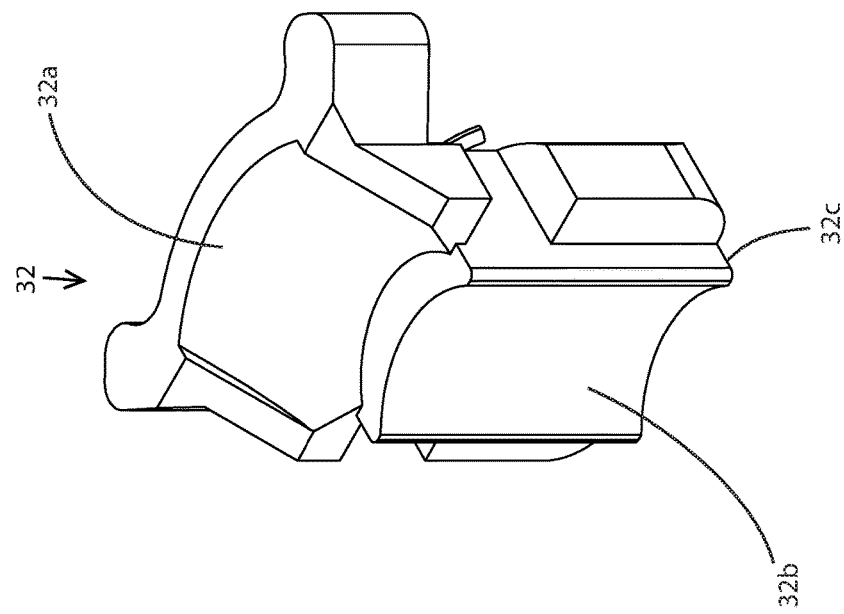
FIG. 5A-5B are perspective views of a sliding block.
Figure 5A:
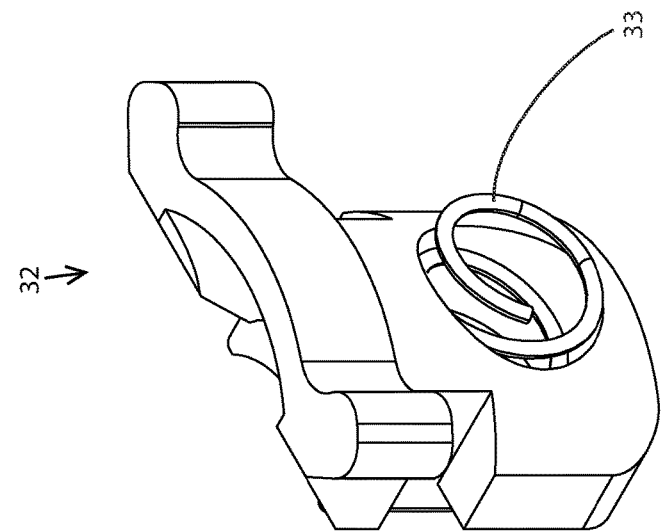

FIG. 5A-5B are perspective views of a sliding block 32 including sliding block spring 33. Sliding block 32 includes a rib interfacing surface 32a configured to interface with a block gliding rib 50 of the device (block gliding rib shown in FIG. 10), and a rod first portion interfacing surface 32b configured to interface with a first portion of the cap 18 during reset of the device 10, as well as a rod interfacing surface 32c configured to interface with an elongate member shoulder of the cap 18 (as described below) during movement of the sliding block 32 in a proximal direction to reset the device 10. An interaction between the angled surfaces of the rib interfacing surface 32a and the sliding block interfacing surface 63 of the sliding block rib 61 during reset of the device 10 causes the sliding block to move outward toward the outer shell 12 to allow passage of the elongate rod of the cap through the chamber 7 to reset the device 10. The angled surfaces are complementary to one another to allow movement of the sliding block 32 in a proximal direction and outward toward the periphery of the device 10 toward the outer shell 12.

Figure 6A:
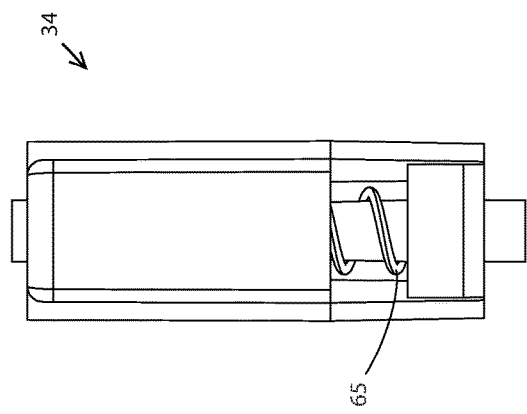
FIGS. 6A-B are perspective views of a guiding pillar.
Figure 6B:
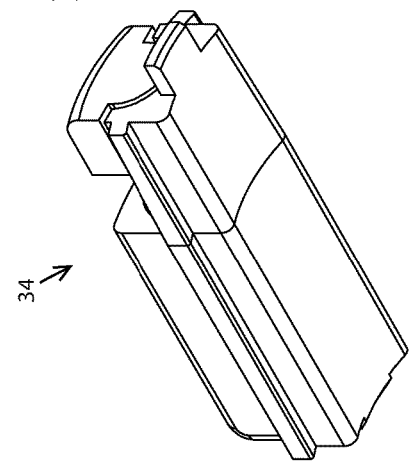
Figure 6C:
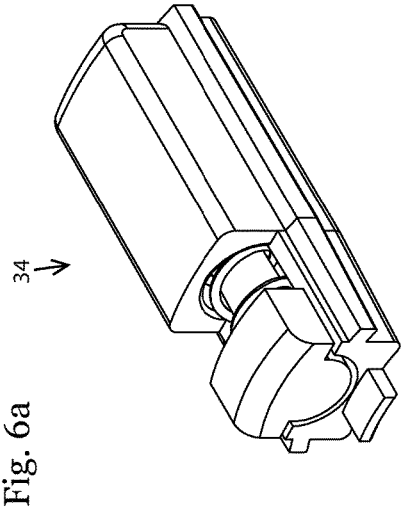
FIG. 6C is a top view of a guiding pillar.
Figure 6D:
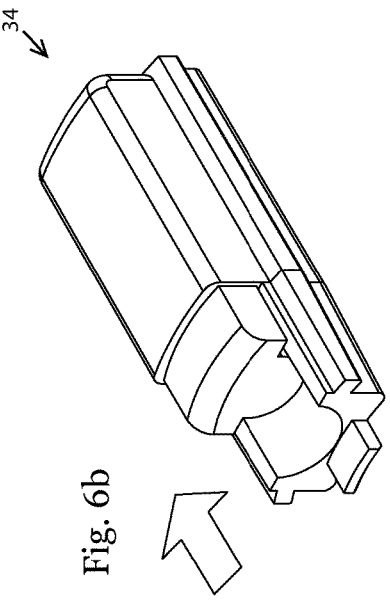
FIG. 6D is a perspective view of a guiding pillar.

FIGS. 6A-D are views of a guiding pillar 34 having a guide spring 65 associated with a spring rod 67. FIGS. 6A, 6C, and 6D show the guiding pillar in an extended position. FIGS. 6A and 6C show the guide spring 35 of the guiding pillar 34. In FIG. 6B the guiding pillar 34 is shown in a compressed position, with guide spring 35 compressed. The guiding pillar 34 prevents jamming of the device 10 during reset and use of the device 10.

Figure 7:
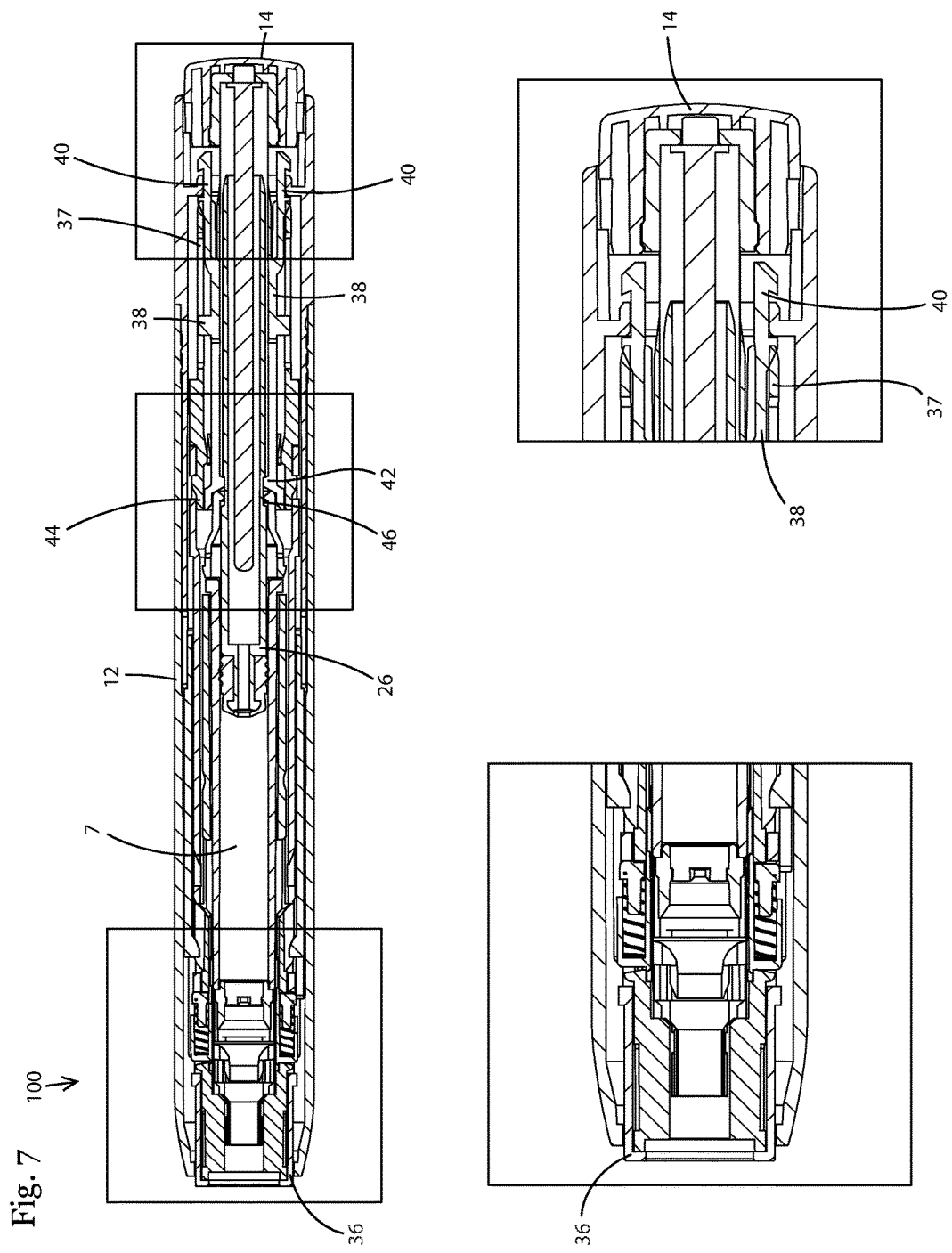
FIG. 7 is a cross sectional view of an embodiment of a resettable injection training device with a depressed shield.

FIG. 7 is a cross sectional view of the embodiment 100 of the resettable injection training device 10 showing a first step in actuation of the device 10 in one embodiment. In FIG. 7, the safety shield 36 is retracted (which can occur by applying a force onto the distal end of the safety shield), a step required in order to unlock the actuation member 14 to allow actuation of the device 10. Retraction of the safety shield 36 causes the outer housing 37 to move in a proximal direction relative to the inner housing 38, such that flexible prongs 40 at a proximal end of the inner housing 38 are biased inward, allowing the actuation member 14 to be unlocked and allowing actuation of the device 10 upon movement of the actuation member 14 in a distal direction following an application of force on the actuation member 14. Chamber 7 is shown, and plunger 26 is slidable within the chamber 7. Firing fingers 42 are shown medial to a collar 44 of the outer housing 37. The plunger 26 includes a plunger groove 46, wherein the firing fingers 42 are interfacing with the plunger groove 46 in FIG. 7, prior to actuation of the device 10 via actuation member 14. In FIG. 7, the shield 36 is in a depressed position, retracted within the outer shell 12 of the device 10, as aforementioned. By unlocking actuation member 14, the actuation member 14 is in an actuatable, compressible position, no longer blocked by the prongs 40.

Figure 8:
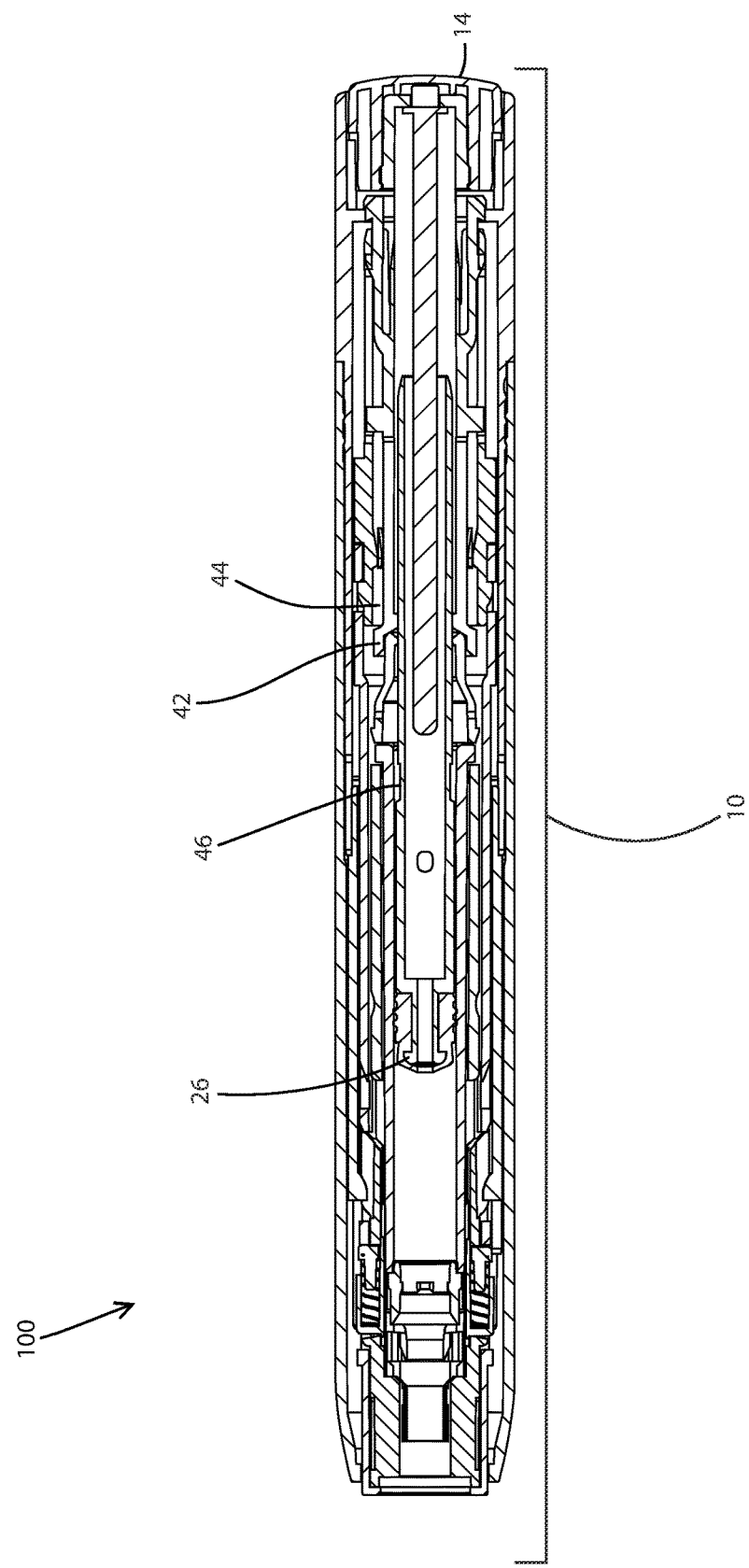
FIG. 8 is a cross sectional view of the embodiment of FIG. 7 in an actuated position.

FIG. 8 shows the embodiment 100 of device 10 shown in FIG. 7, in an actuated position, demonstrating the second step in actuation of the device 10, by moving actuation member 14 toward the proximal end of device 10 to actuate the device 10. Actuation of the actuation member 14 in this manner causes the firing fingers 42 to move past collar 44, allowing them to be released from plunger groove 46 such that plunger groove 46 may traverse the firing fingers 42 as the movement of the actuation member 14 advances the plunger 26 in a distal direction relative to the device 10.

Figure 9:
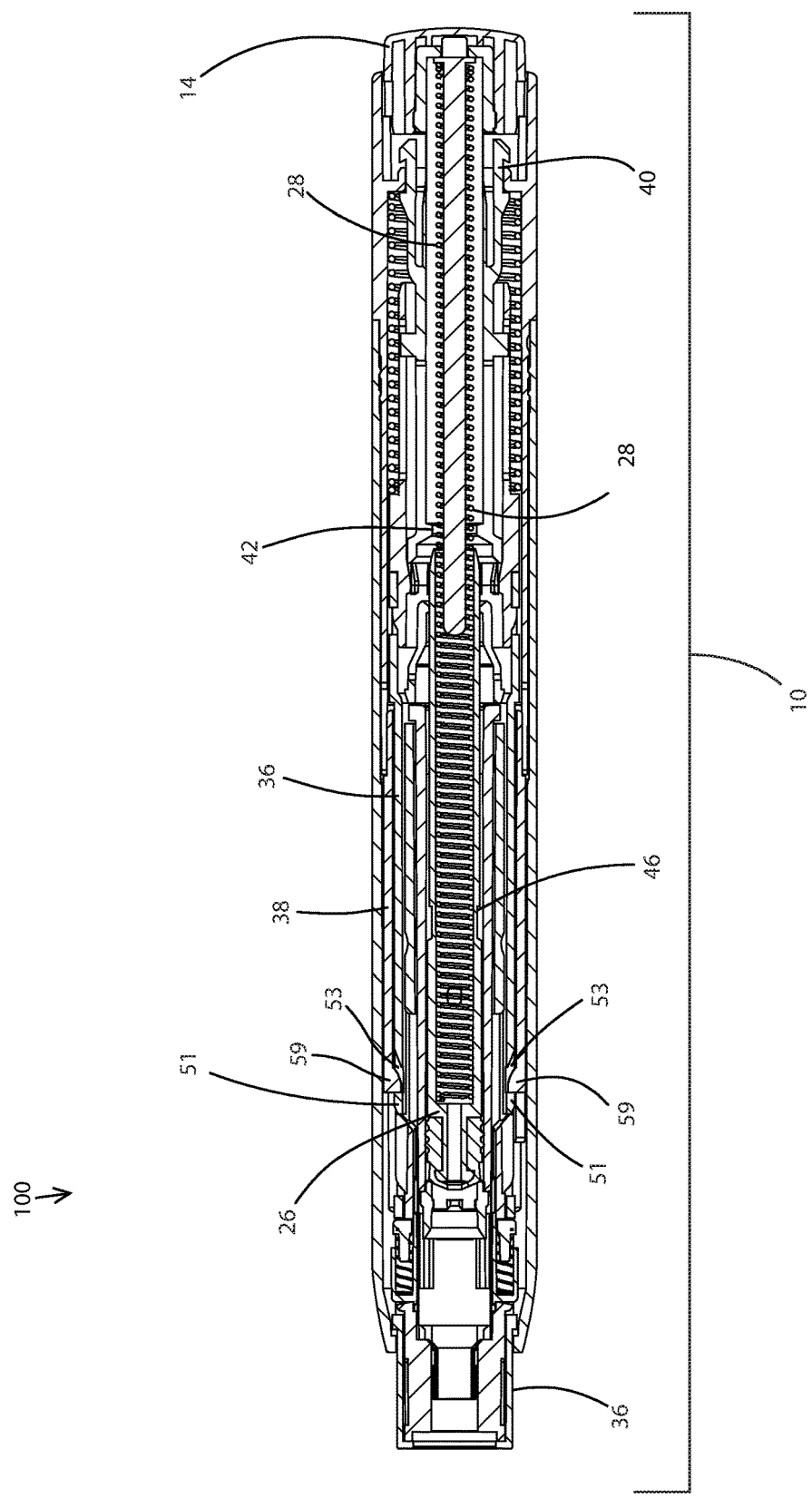
FIG. 9 is a cross sectional view of the embodiment of FIG. 8 in an actuated position with a locked shield.

FIG. 9 is a cross sectional view of the embodiment 100 of the device 10 of FIG. 8 in a post actuation position with the shield 36 in an extended, releasably locked position following actuation. The plunger 26 is at the distal end of the device 10, the outer housing 37 has moved in a proximal direction relative to the inner housing 38, and the prongs 40 are released, locking and preventing actuation of the actuation member 14. The safety lock protrusions 59 of the locking sleeve 38 are each shown as interacting with the locking tab openings 53 of the safety shield locking tabs 51 of the safety shield 36 to maintain the safety shield 36 in an extended, locked position. The plunger spring 28 is shown in an extended position, and the firing fingers 42 are not associated with the plunger groove 46.

FIG. 10A-B provide a side view and a sectional view of the cap 18 having an elongate rod 54. In some embodiments, the elongate rod 54 comprises a configuration that allows for a different frictional force upon insertion of the rod into the device as compared to removal of the rod from the device. The frictional force may be caused by an interaction between an outer surface of the elongate rod 54 and an inner surface of the device upon movement of the elongate rod 54 relative to the device, within the chamber. In one non-limiting embodiment, the frictional force may be caused by the interaction of the elongate rod with an inner wall of the chamber. In another non-limiting embodiment, the frictional force may be caused by an interaction between a non-uniform feature 54c on the elongate rod (described below) and an inner surface of the device defining the chamber. In some non-limiting embodiments, a different frictional force includes a greater force to remove the rod from the device than to insert the rod into the device. In other non-limiting embodiments, the different frictional force may include a greater force to insert the rod into the device than to remove the rod from the device. In a non-limiting embodiment, the elongate rod 54 includes a non-uniform feature 54c, shown in FIGS. 10A, 10B. In the non-limiting embodiment of FIG. 10A, the cap 18 is shown having an elongate rod 54, with a first diameter portion 54a, a second diameter portion 54b, and an optional third diameter portion 54d. A non-uniform feature 54c is shown along the elongate rod 54. The cap 18 includes a cap end 52, and an elongate member shoulder 55 at an intersection between the first diameter 54a and the second diameter 54b, in a non-limiting embodiment. In some non-limiting embodiments, an end portion 54d of the elongate rod 54 may include an arcuate shaped end, to facilitate the movement of the end portion 54d into the chamber 7.

The non-uniform feature 54c is shown in greater detail in FIG. 10B, wherein it includes an asymmetric angled portion, in an embodiment as shown. The asymmetric angled feature may be included such that an insertion force of inserting the elongate rod portion into the device during reset is less than a removal force, the force required to remove the elongate rod portion from the device. The non-uniform feature 54c comprising a first surface 98 and a second surface 99. A first angle phi ($\Phi$) is formed between the longitudinal axis of the elongate rod alpha ($\alpha$) and a longitudinal axis of the first surface beta ($\beta$), and a second angle theta ($\theta$) is formed between the longitudinal axis of the elongate rod a and a longitudinal axis of the second surface gamma ($\gamma$) so as to provide the different directional force, such that the removal force required to remove the elongate rod from the device is greater than an insertion force required to insert the elongate rod into the device, in one, non-limiting example. In one non-limiting example, the first angle $\Phi$ may include an angle less than 180 degrees. In another non-limiting example, the second angle $\theta$ may include an angle of less than 180 degrees and less than the first angle $\Phi$. The diameter of the cap end 52 may include between 15-25 mm. In non-limiting embodiments, the first diameter of the elongate rod may include a diameter of between 0.25-9.9 millimeters, and the second diameter may include a diameter of between 3-10 mm. In another non-limiting embodiment, the difference between the diameters of the first and second diameters may be 0.1-4.0 mm.

In FIG. 11, the distal end of the device 10 is shown with the outer shell 12 and other outer layers removed from the device. The safety shield 36 is in an extended, locked position, sliding blocks 32 are shown as biased inward via the sliding block spring 33 on each sliding block 32, and the sliding block rib 61 is shown.

In FIGS. 12 and 13, a first step in the reset of the device 10 is shown. The cap 18 having a cap end 52, and an elongate rod 54 is provided, and is inserted into the distal end of the device 10 as shown, such that the first diameter 54a of the elongate rod 54 is within the distal end of the device, and is in contact with the first diameter interfacing surface 32b of the sliding blocks 32. The elongate rod 54 includes dimensions allowing it to be receivable within the chamber 13 of the device 10. The cap 18 is slidably engageable relative to the device 10 and can be used to reset the device 10 after actuated, to prepare the device 10 for a subsequent use. In a non-limiting embodiment, the diameter of the cap end 52 may be generally equal to the diameter of the device 10. The cap 18 can be used to release the shield 20 from an extended locked position to an unlocked position, as well as reset the plunger 26 to a pre-actuated position, in addition to reset the actuation mechanism from a locked position to an unlocked position in preparation for a subsequent use of the device 10. As shown in FIG. 12, reset of the device 10 begins with insertion of the elongate rod 54 of the cap 18 into the distal end of the chamber 7. Insertion of the first portion 54a slightly spreads the sliding blocks 32 apart due to the dimensions of the first portion 54a until the shoulder 55 interfaces with the sliding blocks. FIG. 13 is a view of FIG. 12, wherein the device 10 is rotated 90 degrees such that the sliding blocks 32 can be viewed from a different angle.

Figure 14B:
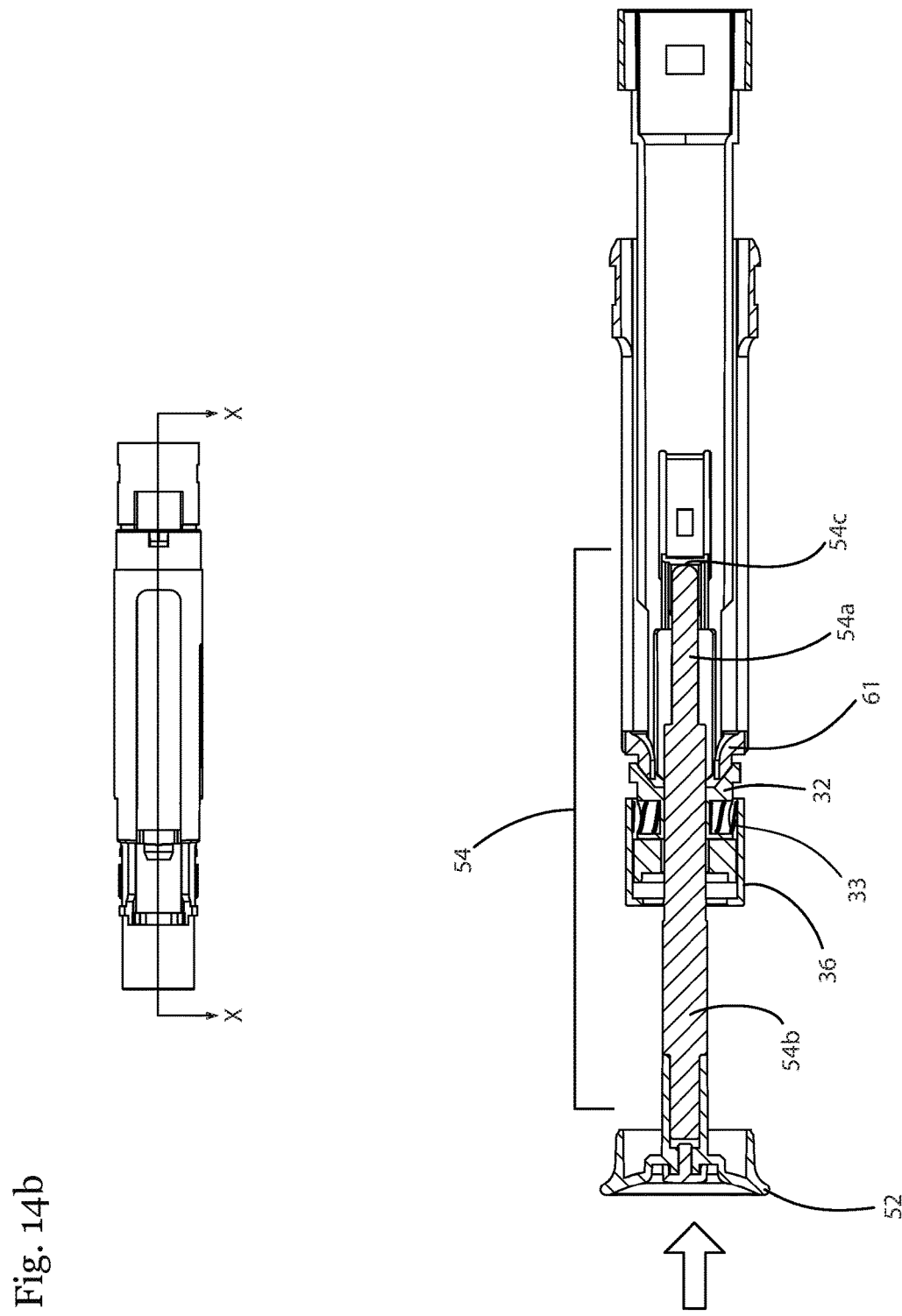
FIG. 14B is a sectional cross sectional view of an embodiment of the device with a cap in a third reset position.

Movement of the cap 18 further toward the proximal end of the device 10 as shown in FIG. 14, causes the shoulder 55 of the elongate rod 54 to move the sliding blocks 32 toward the proximal end of the device 10, wherein further movement of the sliding blocks 32 in this direction allows the sliding blocks 32 to contact the guiding block ribs 61. As a result of the angles of the interfacing surfaces of the sliding blocks 32 and the guiding block ribs 61, via the elongate rod 54 7, and allows the reset shuttle 30 to move in a proximal direction, until the reset tooth 47 interacts with the safety shield locking tab 51, to bias the tab inward as shown in FIG. 14, and release the safety lock interface protrusion 59 from the safety shield locking tab 51 to allow the safety shield 36 to be unlocked and reset. Once the shoulder 55 of the elongate rod 54 passes the sliding blocks 32, the second diameter 54b can enter further into the chamber 13 in a proximal direction until the end portion 54c contacts the plunger 26. Further movement of the cap 18 in the proximal direction compresses the plunger spring 28 to reset the plunger 26.

Figure 15:
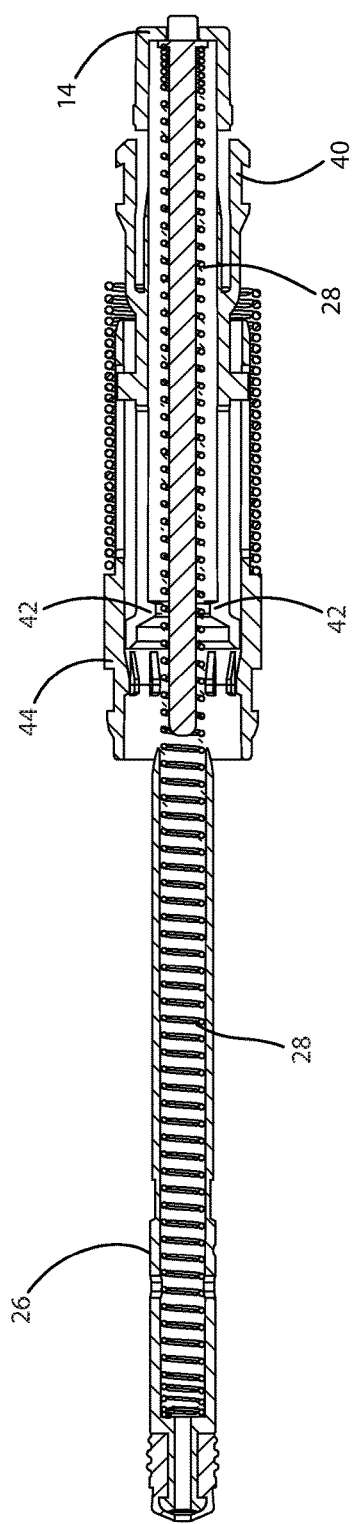
FIG. 15 is a cross sectional view of a portion of an embodiment of the device with a plunger in a fully extended position.
Figure 16:
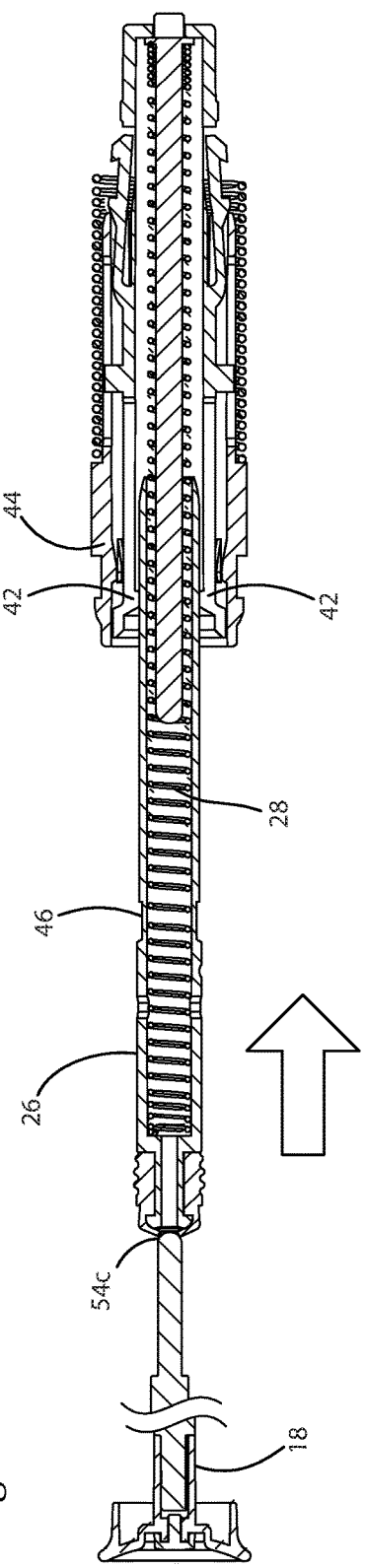
FIG. 16 is a cross sectional view shown in FIG. 15, with the plunger in a partially reset position, showing the cap in contact with the plunger.
Figure 17:
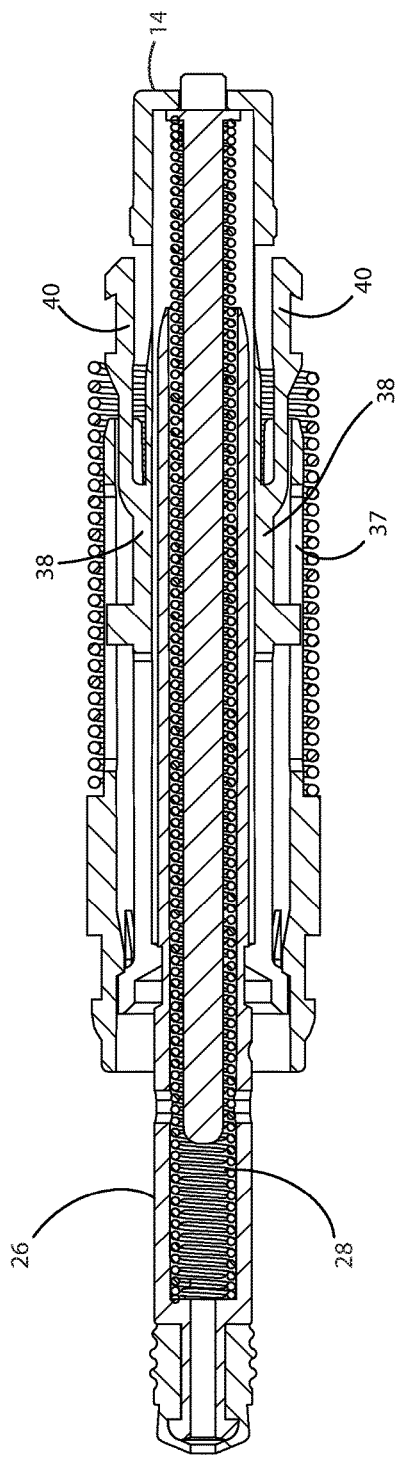
FIG. 17 is a cross sectional view of a portion of the embodiment of FIG. 16 with the plunger in a fully reset position.
Figure 18:
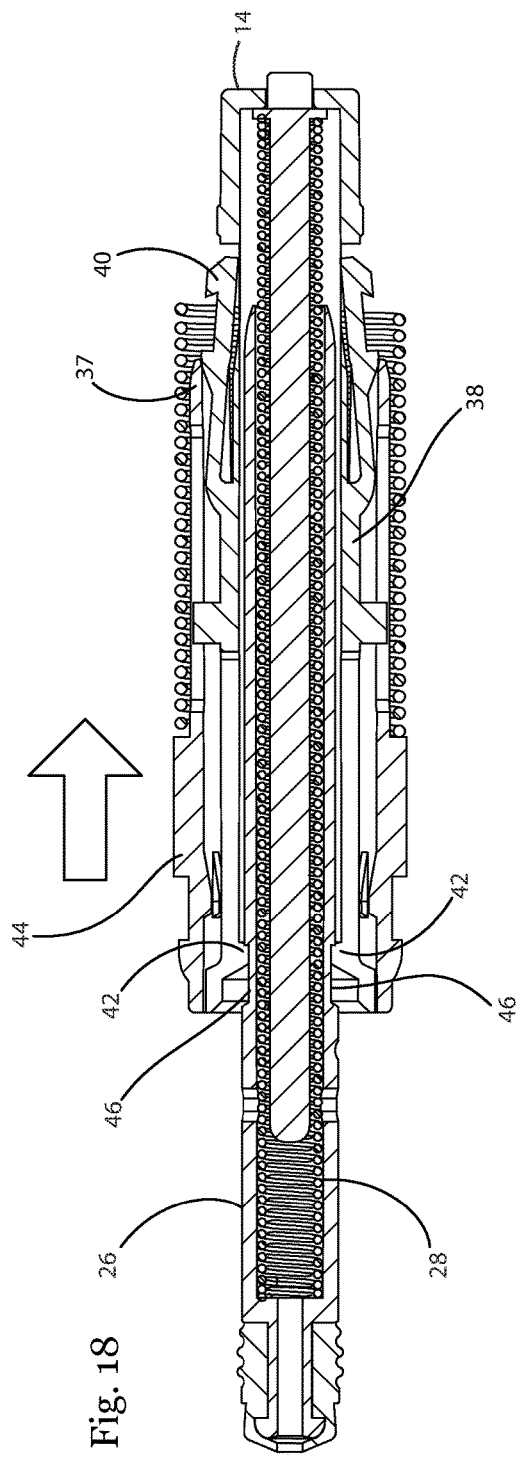
FIG. 18 is a cut-away cross sectional view of a portion of the embodiment of FIG. 17 with an outer housing in a reset position.

FIG. 15 shows the plunger in a post actuation position, wherein the plunger spring 28 is extended, and the prongs 40 are in a relaxed position, locking the actuation member 14 to prevent re-actuation of the device 10 until reset of the device. FIG. 16 shows the cap 18 being moved toward the proximal end of the device 10, exerting a pressure on the distal end of the plunger 26 to reset the plunger 26 from a post actuation position (as in FIG. 15) to a reset position. In FIG. 16, the plunger 26 is shown in mid-reset position and the plunger spring 28 is partially compressed. Between FIG. 15 and FIG. 16, the collar 44 is moved toward the proximal end of the device 10 from a post-actuation position to a reset position, wherein the firing fingers 42 are shown near the end of collar 44 in a reset position in FIG. 17. FIG. 17 shows the plunger 26 in a near-reset position, wherein the firing fingers 42 are interfacing with the plunger groove 46. FIGS. 17-18 show another view of the reset of the collar 44, as it is moved toward the proximal end of the device 10 from FIG. 17 to FIG. 18 during reset of the device 10.

Reset of the collar 44 results in the outer housing 37 sliding relative to the inner housing 38 toward the proximal end of the device 10 such that the upper portion of the outer housing 37 biases the inner housing prongs 40 inward to reset and unlock the actuation member 14. In FIG. 17, the inner housing prongs 40 are in a position preventing the actuation member 14 from actuating the device 10 wherein any movement of the actuation member 14 fails to actuate the device in FIG. 17. In FIG. 18, the inner housing prongs 40 are shown biased inward allowing the unlocked actuation member 14 to actuate the device 10 when the actuation member 14 is moved toward a distal end of the device 10 upon application of a force on the actuation member 14.

Figure 19:
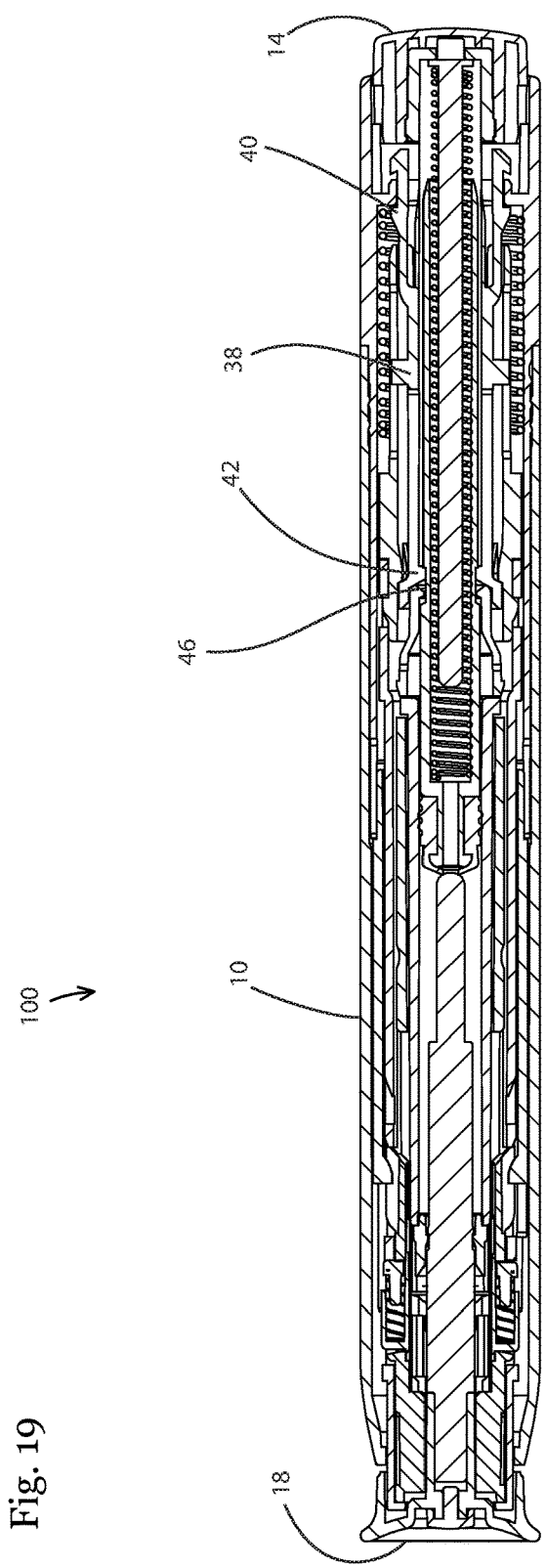
FIG. 19 is a cross sectional view of the embodiment of FIG. 7 with a cap thereon, the device in a fully reset position.

FIG. 19 is a cross sectional view of the embodiment of the device 10 in a fully reset position with the cap 18 on the device 10, the firing fingers 42 within the plunger groove 46, and the actuation member 14 in the locked position, wherein compression of the actuation member 14 fails to activate the device 10, although compression of the actuation member 14 may move the actuation member.

Figure 20:
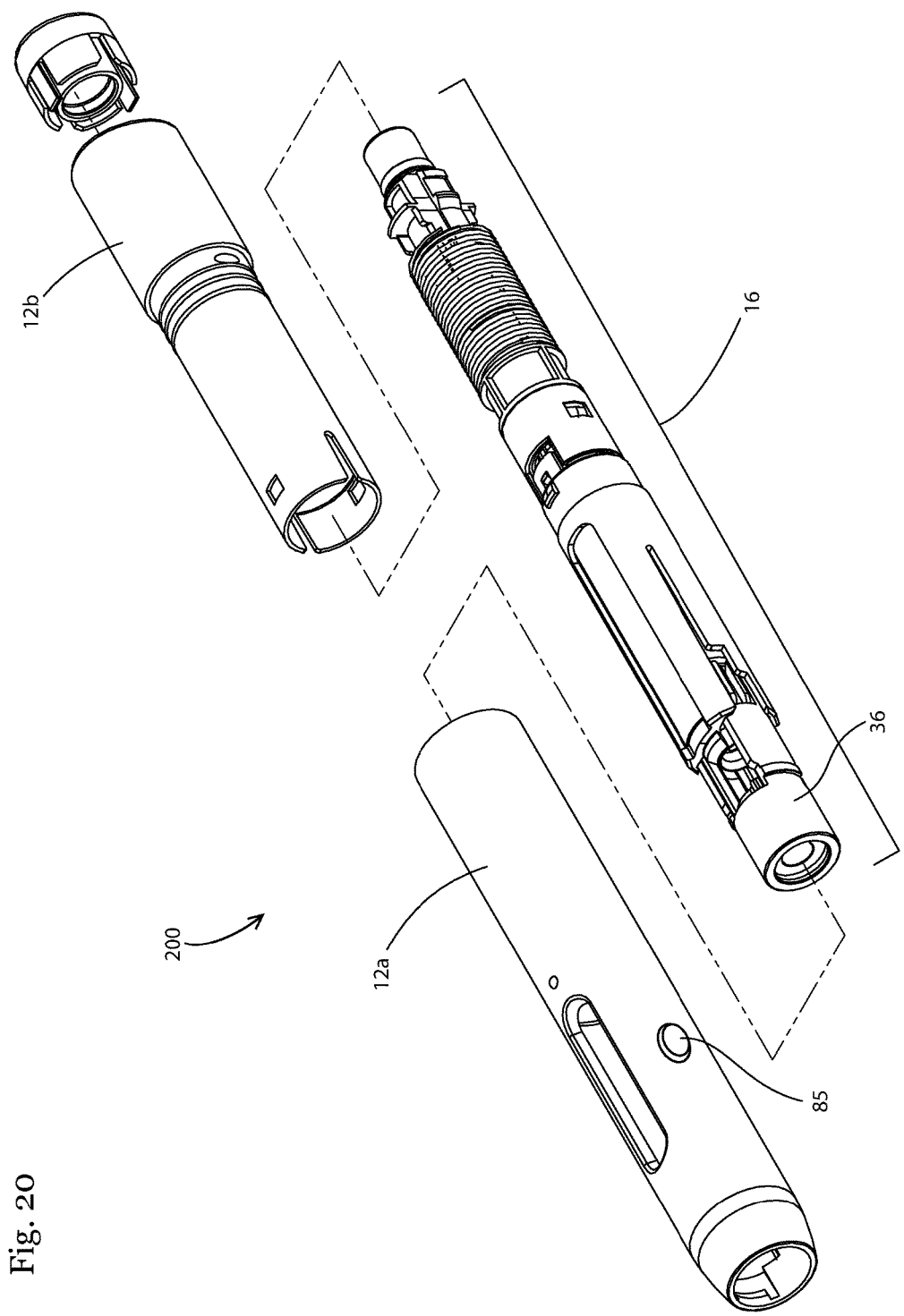
FIG. 20 is an exploded view of another embodiment of the device.

FIG. 20 is an exploded view of another embodiment 200 of the device 80 including an outer shell 12 having an outer upper shell 12b and an outer lower shell 12a which may be connectable by any of the methods described herein or known to those skilled in the art. The embodiment 200 of the device 80 includes an internal mechanical assembly 16 including a safety shield 36, and further includes a safety shield release member 85, wherein activation of the safety shield release member releases the safety shield 36 from an extended locked position to an unlocked position. The safety shield release member 85 may be provided on an outer surface of the device 80, and may axially and/or circumferentially aligned with the safety lock protrusion and/or safety shield locking tab 51 and may be configured to interact with the safety shield locking tab 51 (shown in the exploded view of the safety shield assembly FIG. 21), in a non-limiting embodiment, on the safety shield 36 to compress the safety shield locking tab 52, biasing it inwardly, to release the safety lock protrusion 59 on the locking sleeve 38 from the locking tab opening 53.

Figure 21:
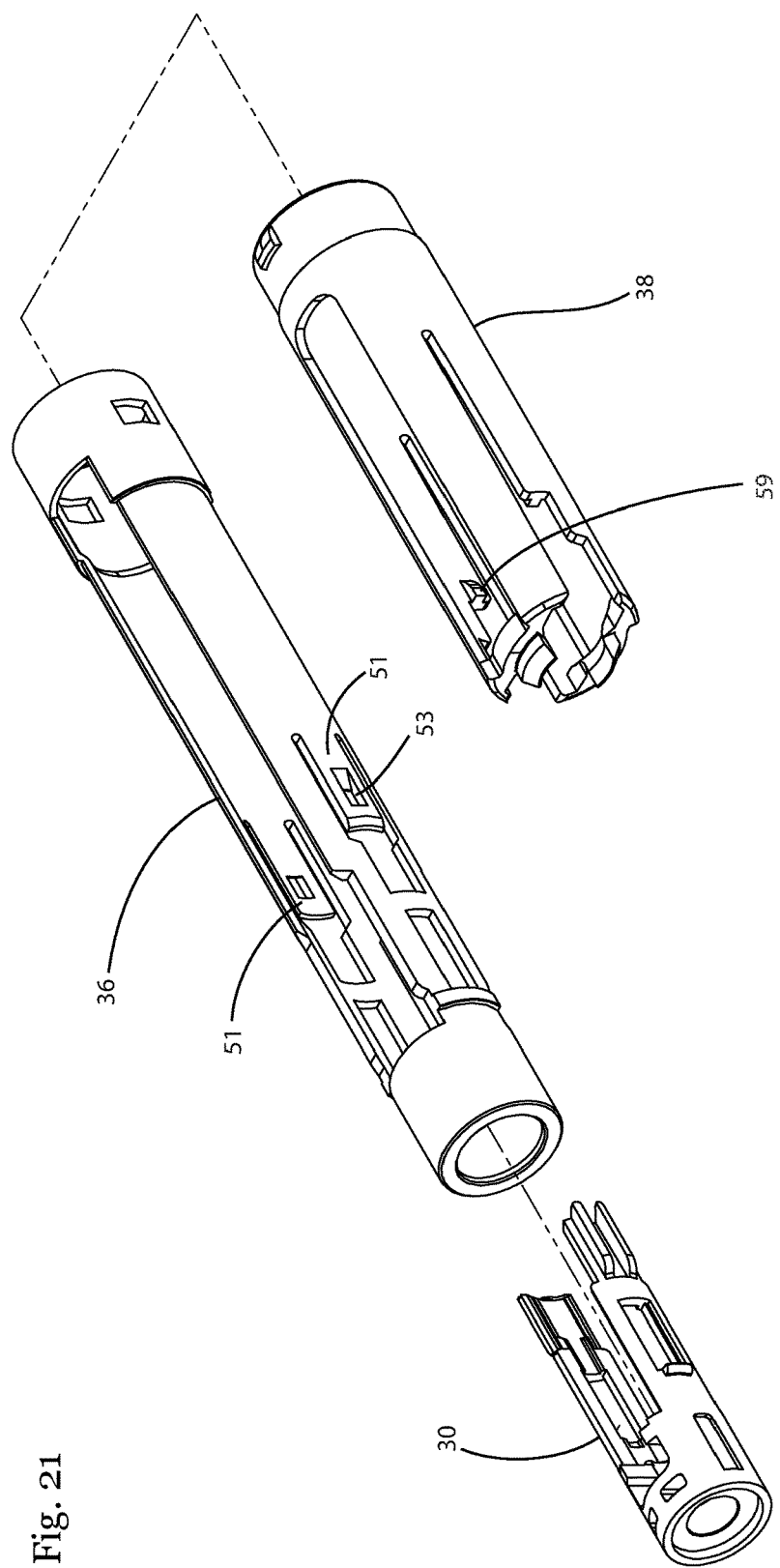
FIG. 21 is an exploded view of the internal reset mechanical assembly of the embodiment of the device of FIG. 20.

In a non-limiting embodiment shown in the exploded view of FIG. 21, the embodiment 200 may further include a reset shuttle 30. The reset shuttle 30 may be used, wherein a cap or other reset tool may be inserted into the device 80 to effect reset of the device 80 by contacting the plunger (not shown), and moving the plunger to a pre-use position, toward the proximal end of the device 80 for a subsequent use.

Figure 22A:
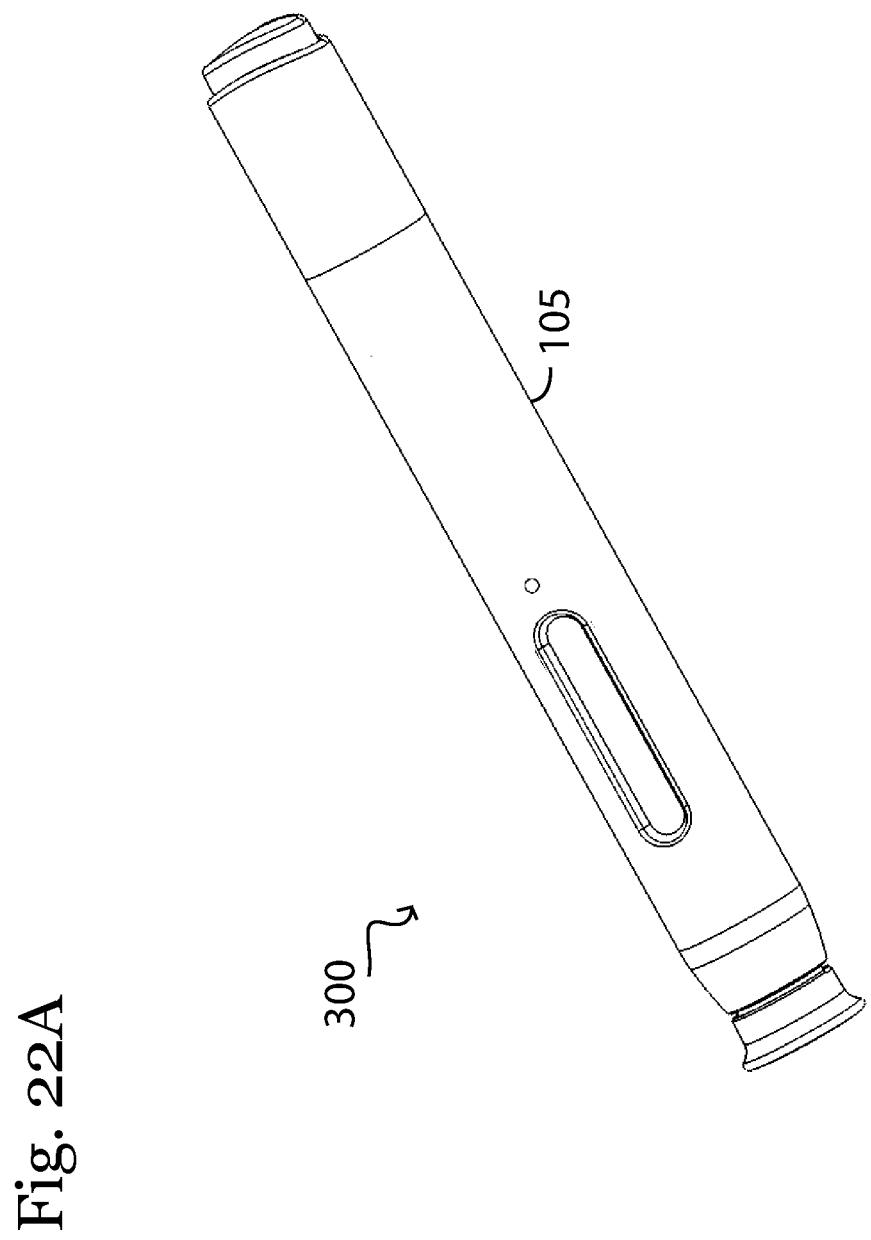
FIG. 22A is a perspective view of an embodiment of a resettable injection training device.
Figure 22B:
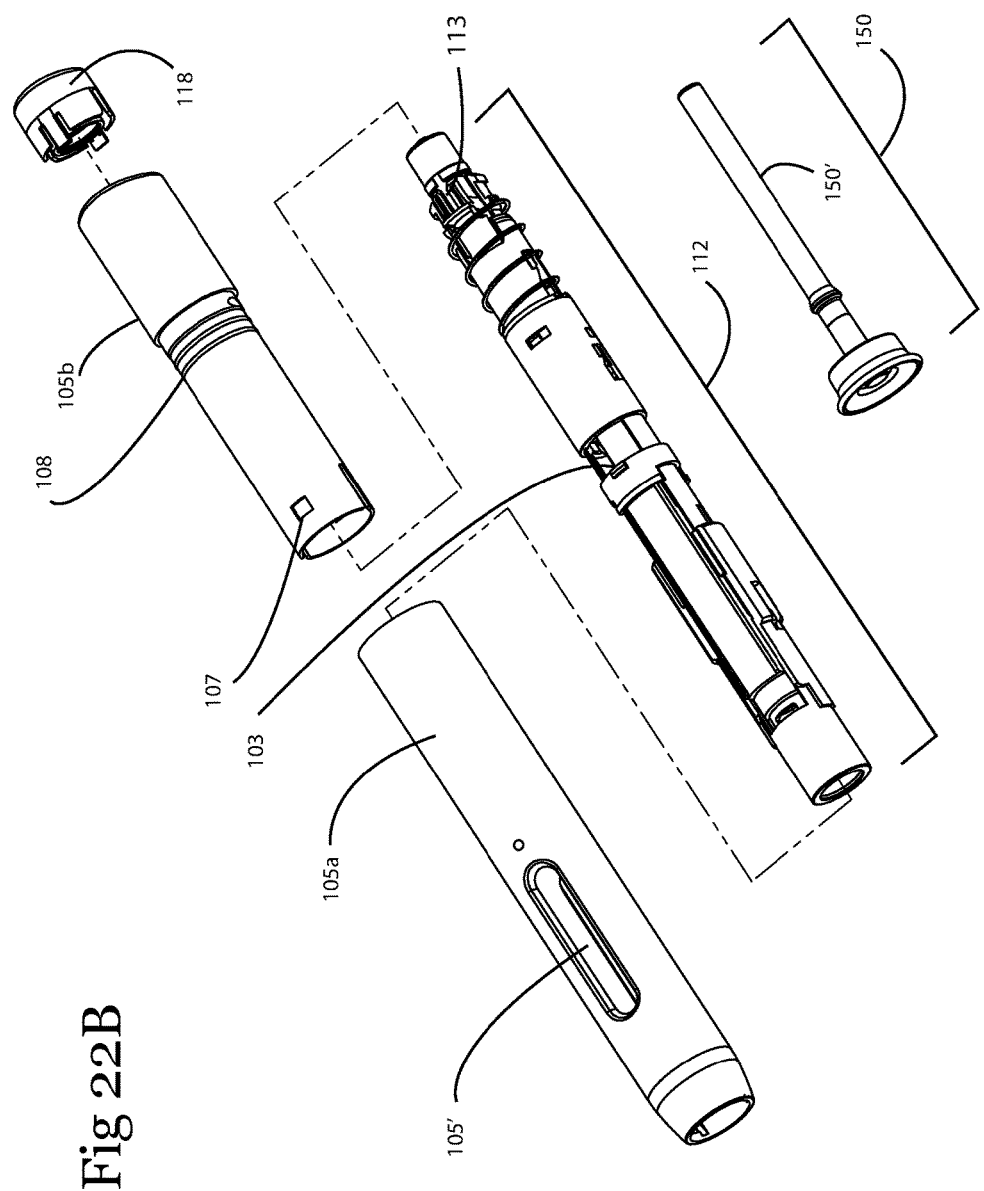
FIG. 22B shows a disassembled view of the embodiment shown in FIG. 22A

FIG. 22A shows a perspective view of another embodiment 300 of a resettable injection training device with a housing 105. FIG. 22B shows a partially disassembled view of the embodiment 300. The embodiment 300 includes two housing components 105a,b that engaged together with an internal mechanical assembly 112 provided therein. The housing components 105a,b are secured together by interacting ribs 108 on housing component 105b via a snap or frictional fit. The mechanical assembly 112 comprises multiple subassemblies that will be further described below. The mechanical assembly includes an anti-rotational groove 113 that interacts with a protrusion (not shown) provided in the housing component 105b as well as a locking interacting tab 103 which interacts with opening 107 on housing component 105b to interlock housing component 105b with internal mechanical assembly 112 when the device is assembled. Also shown in FIG. 22B is a cap 150 that includes reset rod 150'.

Figure 23:
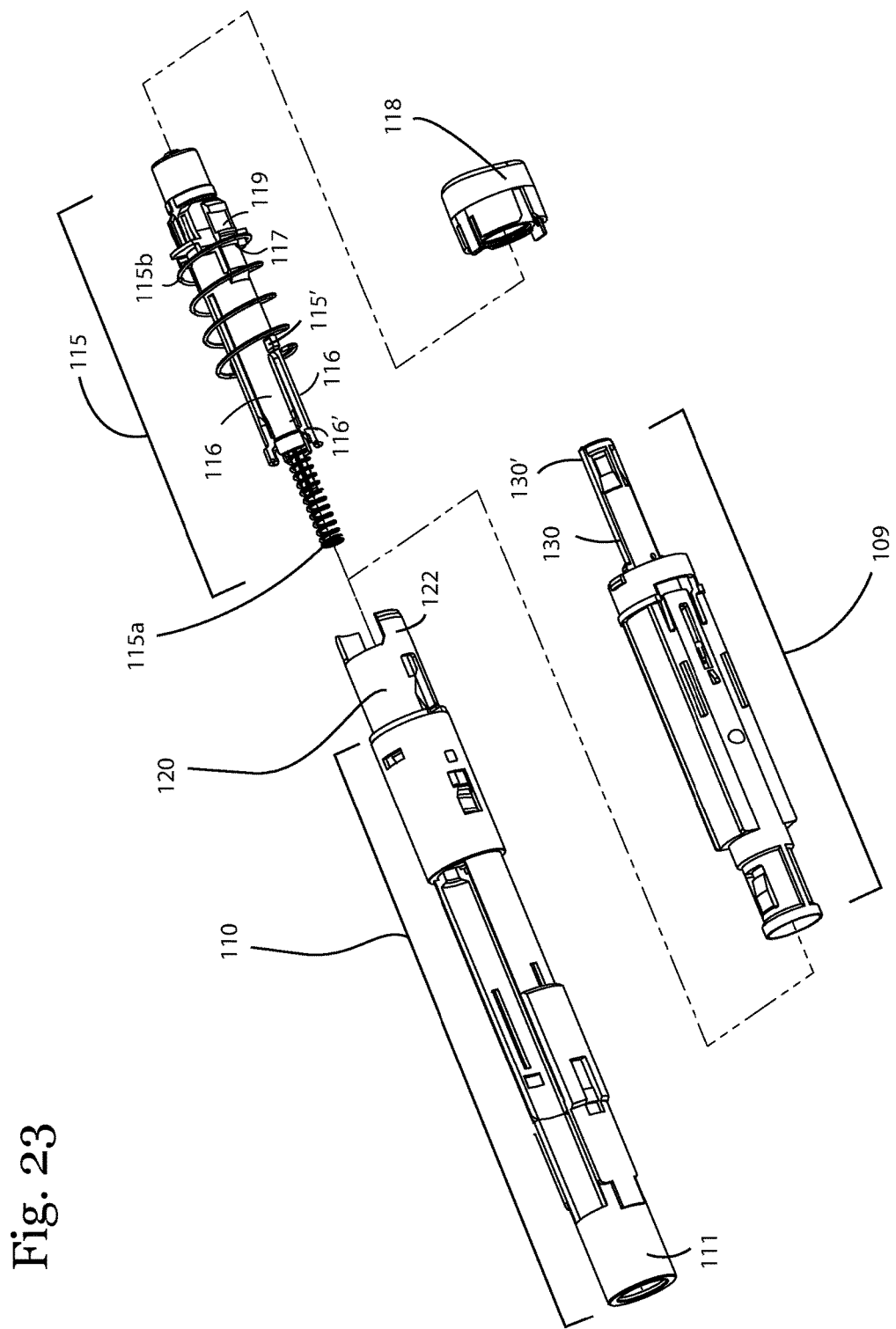
FIG. 23 is a disassembled view of an internal mechanical assembly embodiment of the resettable injection training device of FIG. 22A-B.
Figure 26:
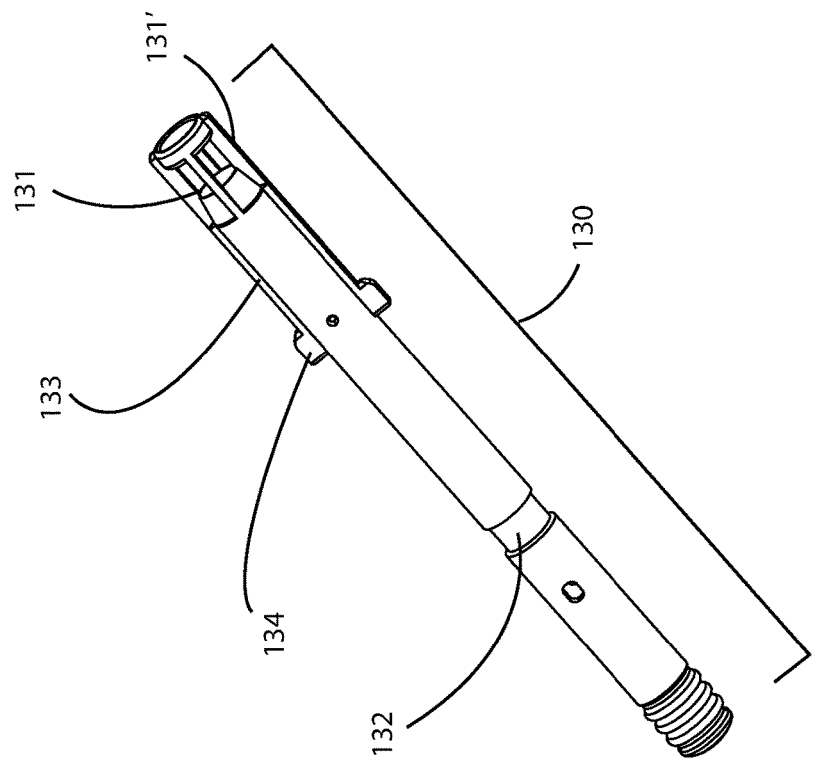
FIG. 26 is a perspective view of a plunger component.

FIG. 23 shows a partially disassembled view of the mechanical assembly 112 shown in FIG. 22. The mechanical assembly 112 includes a locking safety shield assembly 110, a medication simulator window assembly 109 (including the plunger component 130) and an actuation assembly 115. A rotatable locking sleeve 120 is associated with the proximal end of the safety shield assembly 110. The actuation assembly 115 includes a plunger actuation spring 115*a* that is inserted into the proximal end 130' of the plunger 130. The actuation assembly 115 includes plunger locking arms 116 (4 total, 3 shown) that have a plunger catch 116' that extend inwardly and interact with the plunger groove 132 (FIG. 26). Disposed on a portion of the outer surface of the assembly 115 is the rotatable locking sleeve reset spring 115*b*. As will be explained in relation to FIG. 27, during actuation, the plunger locking portion 116 deflects to release the plunger 130.

The actuation assembly 115 associates with a button 118 at its proximal end. The actuation assembly 115 also includes a proximal ramp portion 117 that interacts with an actuation releasing portion 122 of the locking sleeve 120. The actuation assembly further includes a locking tab 119 that interacts with catch member 106 of the outer housing (see FIG. 31). The distal end of the safety shield assembly 110 includes the safety shield distal portion 111.

Figure 24:
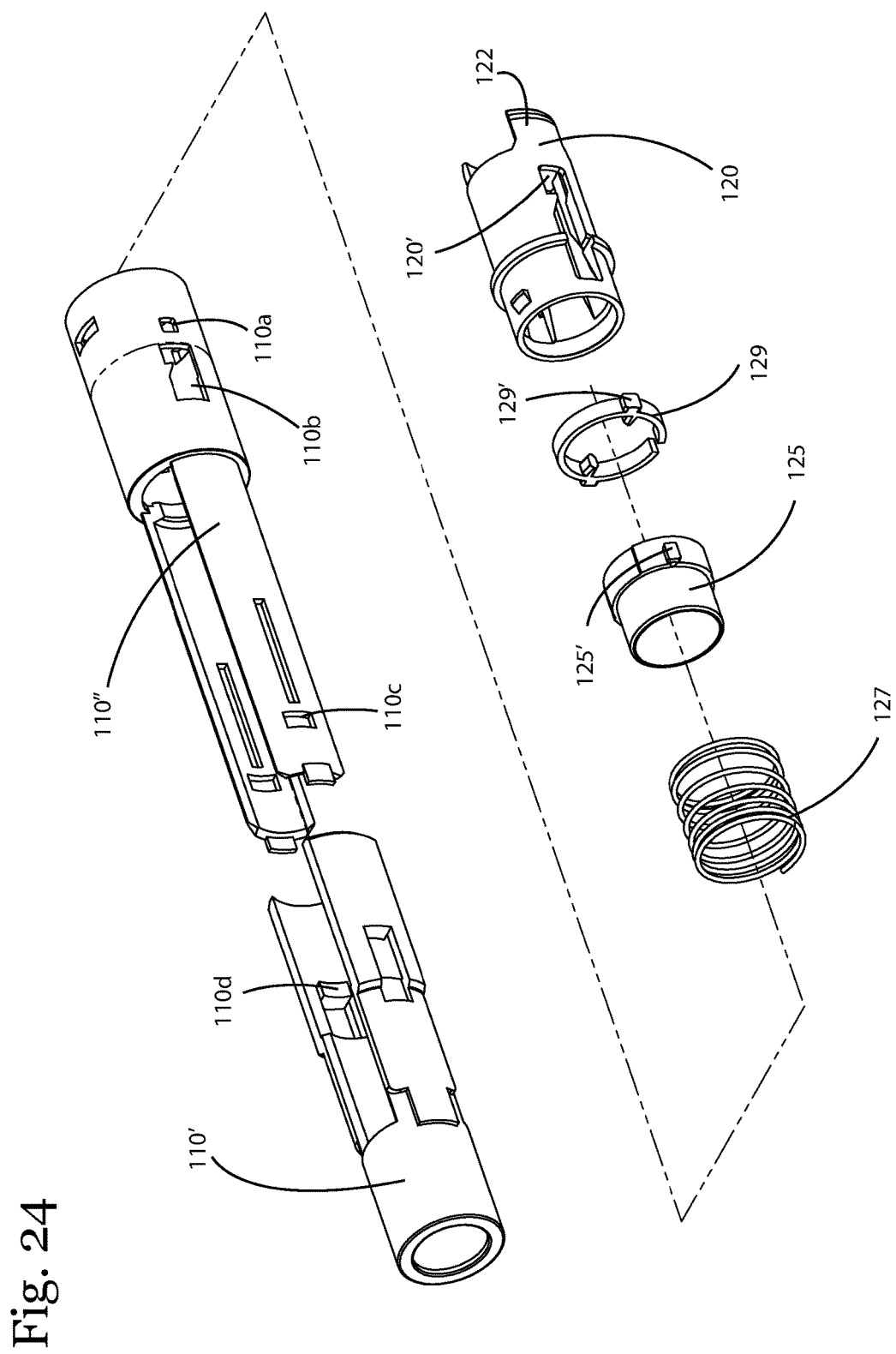
FIG. 24 is a disassembled view of a safety shield assembly of the resettable injection training device of FIGS. 22A-B, 23.

FIG. 24 shows a perspective view of a further disassembled view of the safety shield assembly 110 as well as the actuation collar reset spring 127, actuation collar 125, and plunger reset ring 129 contained within the safety shield assembly 110, and the rotatable locking sleeve 120 that is partially contained within the safety shield assembly 110. The safety shield assembly includes two components 110' and 110" that lock together via locking opening 110*c* and locking tab 110*d*. Component 110" includes a locking opening 110*a* that interacts with locking tab 129' provided on the plunger reset ring 129. The rotatable locking sleeve 120 includes an actuation releasing portion 122 whose function will be described in relation to FIGS. 27A-E and 28A-B herein. Rotatable locking sleeve 120 also includes a locking protrusion window 120' that interacts with sleeve locking protrusion 115' of the actuation assembly 115.

Figure 25:
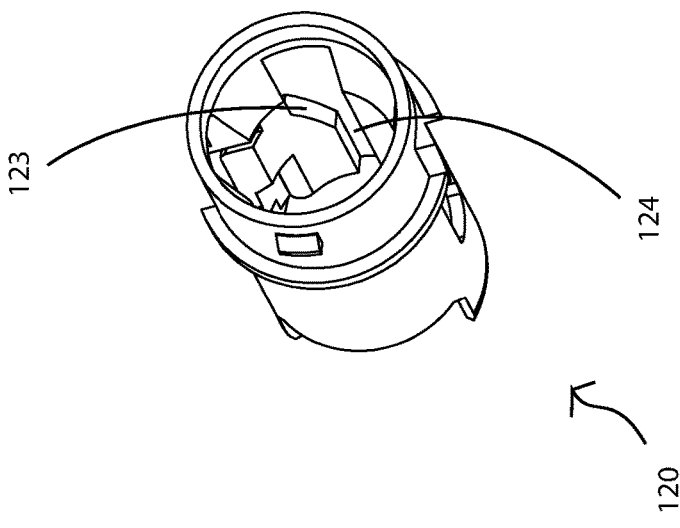
FIG. 25 is a perspective view of a rotatable locking sleeve.

FIG. 25 shows an end perspective view of the locking sleeve 120 to show certain features provided therein. As seen is a plunger interacting ramp 123 and plunger interacting groove 124 that interact with the plunger tab 134 (FIG. 26) as described in relation to FIGS. 28A-B and FIG. 29.

FIG. 26 is a perspective view of the plunger 130. The plunger 130 includes a plunger end opening 131 on the proximal end 131', a plunger groove 132, plunger anti-rotational rail 133, and a plunger tab 134.

FIG. 27A-E shows a series of cut-away views that illustrate the action of certain internal components of the embodiment 300. From left to right, the series represents different states of the embodiment 300: a reset and ready to fire state (state 1, FIG. 27A), safety shield depressed (state 2, FIG. 27B), button actuated (state 3, FIG. 27C), plunger and locking sleeve movement (state 4, FIG. 27D), and injection complete state with safety shield in extended locked position (state 5, FIG. 27E). For state 1, the safety shield assembly 110 is in an extended reset position. The actuation collar 125 covers and holds the plunger locking portion (not shown for state 1). Actuation requires that the safety shield assembly 110 and the actuation button 118 be depressed at the same time. If one or the other, but not both, is depressed the plunger will not fire. In state 2, the safety shield 111 is depressed. This causes the safety shield assembly 110, the locking sleeve 120 and the actuation collar 125 to slide up. As can be seen, the outside of the plunger locking arms 116 extend slightly under the actuation collar 125. Also, the actuation release portion 122 abuts against the ramp portion 117, which stages the embodiment 300 for firing if the button 118 is actuated. State 3 shows the button 118 in a depressed state which pushes the plunger locking arm 116 fully past the actuation collar 125, which causes the firing of the plunger 130 by allowing the plunger locking arm 116 to deflect out thereby releasing the plunger 130 (the plunger catch 116' (FIG. 30) releases from plunger groove 132 (FIG. 30)). In state 4, the plunger actuation spring (115*a*, FIG. 23) drives the plunger 130 toward the distal end of the embodiment 300. As the plunger 130 travels distally, the locking sleeve 120 rotates (see arrow). In state 5, once the plunger 130 has fully traveled to its distal position, the safety shield distal portion 111 is released and the safety shield assembly and locking sleeve are urged distally by locking sleeve spring 115*b* to assume the extended locked position of the safety shield assembly 110. The locking sleeve 120 locks by interfacing between a sleeve locking member 143 and a sleeve locking protrusion 115' associated with the actuation assembly 115. The change of the relative positioning of the locking protrusion 115' and sleeve locking member 143 is shown from state to state. As the injection simulation is occurring during state 4, the plunger 130 can be seen moving through viewing window 105' (FIG. 22).

Figure 28A:
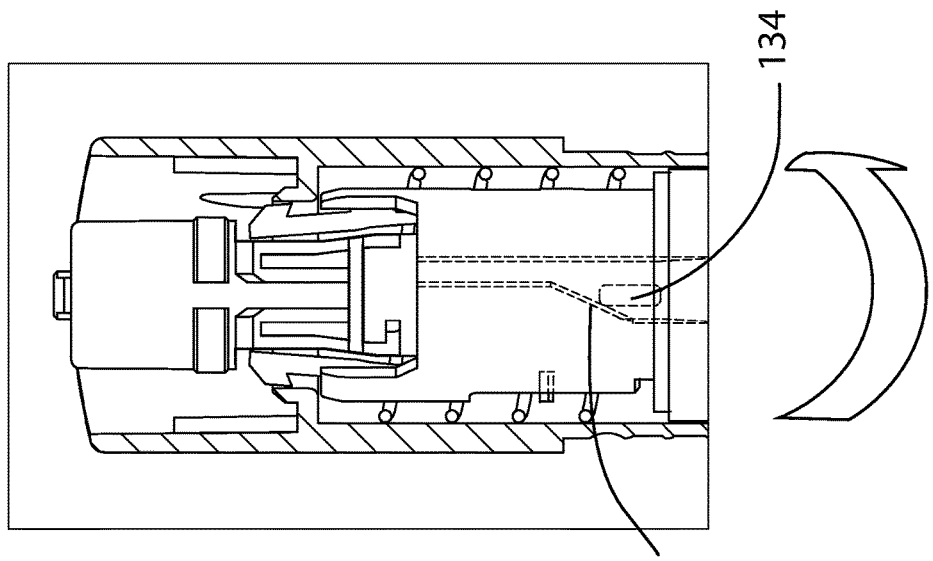
FIGS. 28A-B are partial cross sectional views of an embodiment of the resettable injection training device of FIG. 22A-B.
Figure 28B:
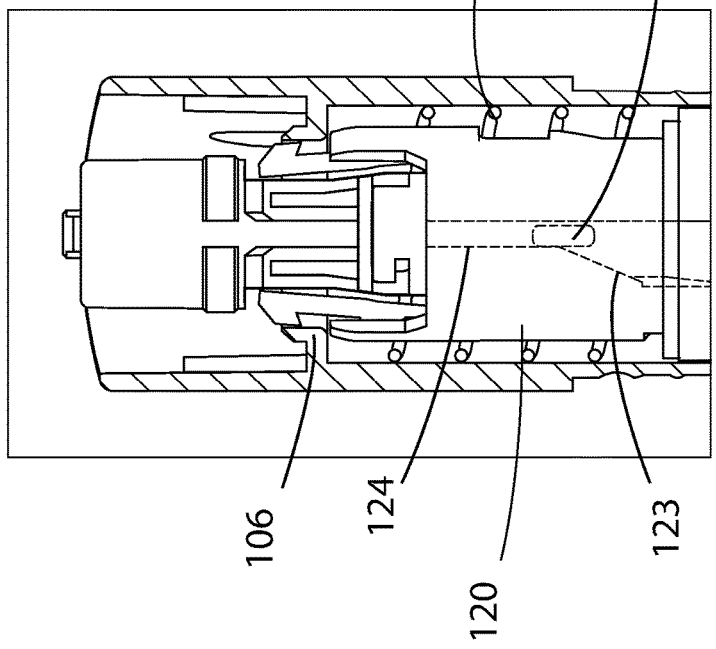
Figure 29A:
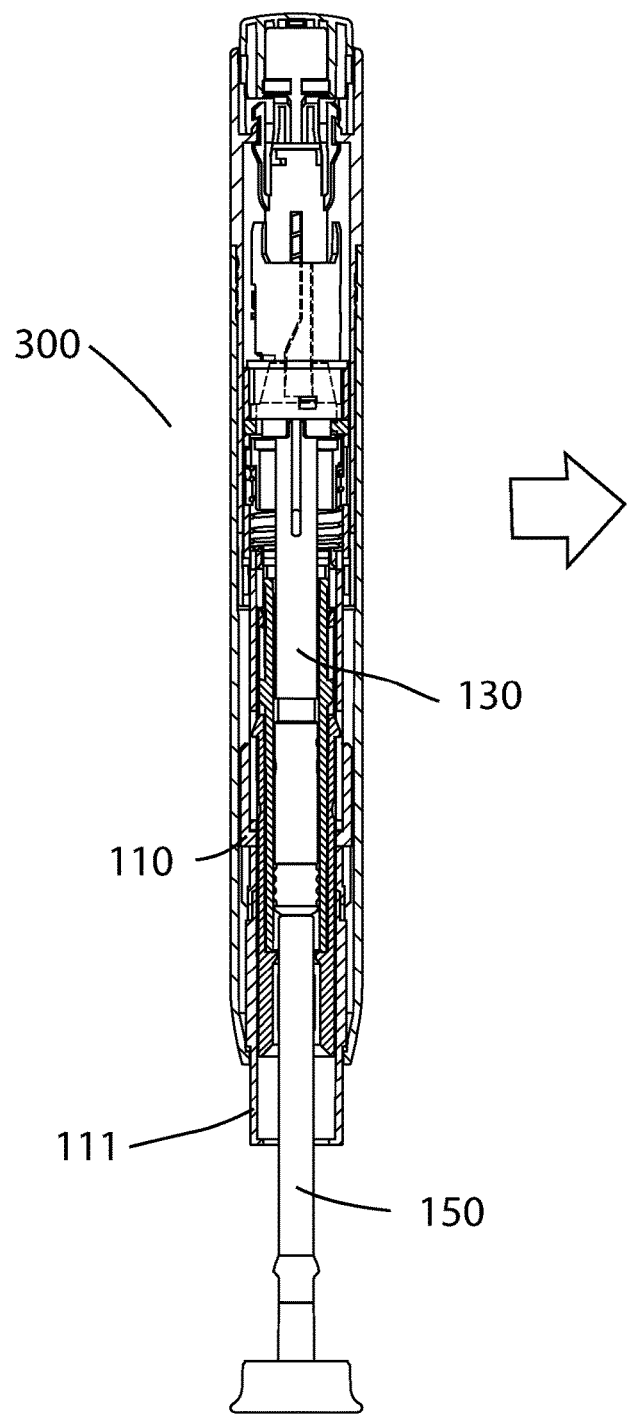
FIGS. 29A-B are cross-sectional views of embodiment of the resettable injection training device of FIG. 22A-B during reset.

FIG. 28A-B shows a side view of the locking sleeve 120 that shows the interaction of the plunger tab 134 with the plunger interacting groove 124. FIG. 28A shows the plunger tab 134 in the plunger interacting groove. As the plunger 130 moves distally, the plunger tab 134 interacts with the plunger interacting ramp 123 as shown in FIG. 28B. Locking sleeve spring 115*b* urges the locking sleeve to rotate as the plunger tab 134 traverses the plunger interacting ramp 123. This rotation of the locking sleeve 120 allows the interaction between the sleeve locking member 143 and sleeve locking protrusion 115' as discussed above in relation to FIG. 27.

Figure 29B:
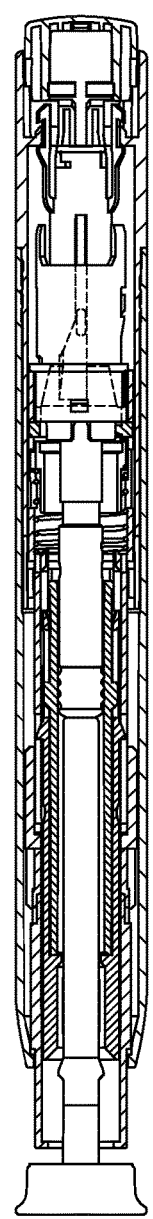

FIGS. 29A-B, FIG. 30A-B and FIG. 31A-B show the first stage of the process of resetting embodiment 300 after injection simulation is completed and the safety shield assembly 110 is in its extended locked position. The reset rod 150 is inserted into the distal end of the safety shield 111 and abuts against the distal end of the plunger 130. The plunger 130 is pushed up toward the proximal end of the embodiment 300, which unlocks the safety shield assembly 110 as shown in FIG. 29B. Unlocking of the safety shield assembly 110 is caused by the interaction of the plunger tab 134 and the plunger interacting ramp 123 (shown in FIGS. 30A-B) which rotates the locking sleeve 120 such that the sleeve locking member 143 and sleeve locking protrusion 115' disengage. Once unlocked, the safety shield assembly 110 and locking sleeve 120 continue to be moved toward the proximal end of the embodiment 300.

Figure 34:
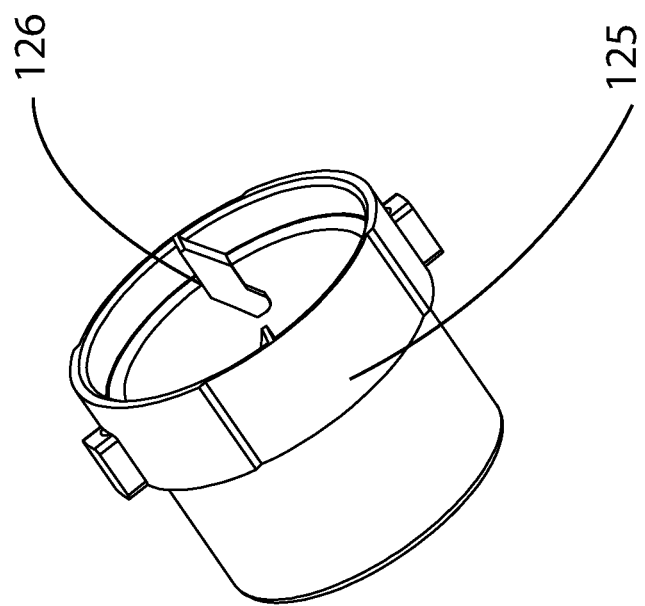
FIG. 34 shows a side perspective view of an actuation collar.
Figure 35A:
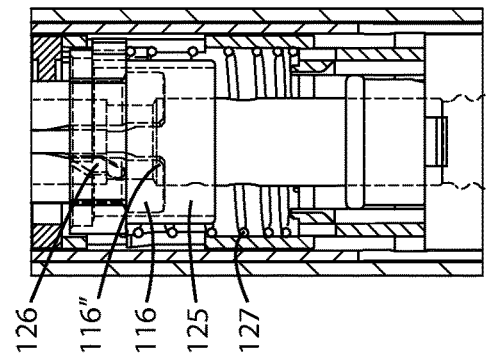
FIG. 35A-D show partial cross-sectional views of a portion of the embodiment of the resettable injection training device of FIGS. 22A-B.
Figure 35B:
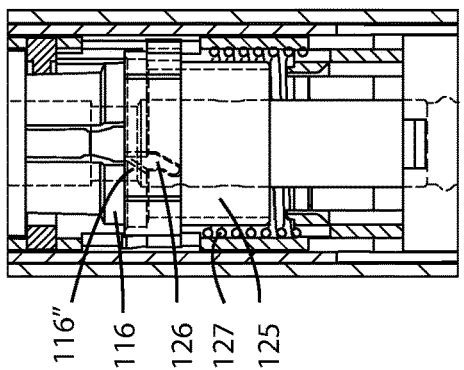
Figure 35C:
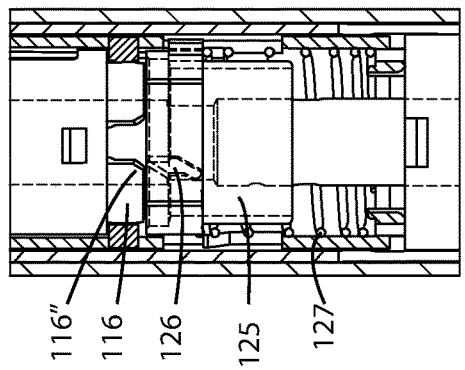
Figure 35D:
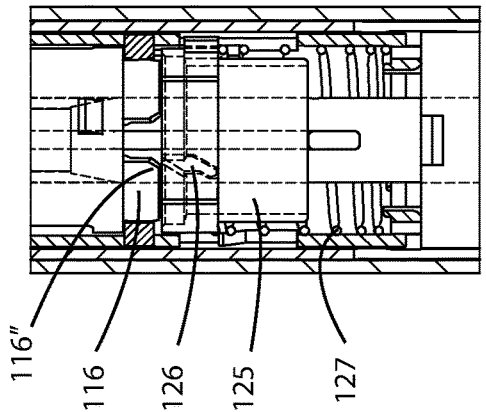

Next, reset of the actuation assembly and plunger will be discussed in relation to FIGS. 34 and 35A-D. FIG. 34 shows a side perspective view of the actuation collar 125. The actuation collar 125 includes an actuation reset ramp 126 that interacts with the distal end of the plunger locking portion 116. The plunger locking portion 116 (plunger unlocking portion 116 shown in FIGS. 35A-D) includes a collar interacting ridge 116" that interacts with the actuation reset ramp 126. As shown in FIG. 35C, as the plunger 130 moves proximally during reset, the actuation collar rotates slightly and the reset ramp 126 is urged into the gap 115"

between respective plunger locking arms 116. The actuation collar reset spring 127 urges the actuation collar 125 up in a proximal direction until the actuation reset ramp 126 passes the collar interacting ridge 116" and slides back over such that the actuation reset ramp 126 catches the collar interacting ridge 116" to hold the actuation collar 125 over the plunger locking arms 116. This holds the plunger in place until injection is initiated as described in FIG. 27.

FIG. 32 shows a longitudinal cross-section view of embodiment 300 with the cap 150 and reset rod 150' fully inserted for resetting. The close up portion shows the plunger catch 116' interacting with the plunger ridge 132 thereby holding the plunger 130 in the reset position. Also shown is the plunger actuation spring 115a. Also shown are the actuation collar 125 and the actuation reset ramp 126. Given the complexity of the foregoing arrangement, the elements discussed with respect to FIG. 32 are shown in cross-section view without cross-hatching.

FIG. 33A shows a cross-sectional view of embodiment 300 in the fully reset position with the cap 150 and reset rod 150' removed. Close-up FIG. 33B shows the plunger catch 116' interacting with the plunger ridge 132 from a different perspective to that shown in FIG. 32. FIG. 33C shows a close-up of the proximal end of the embodiment showing the ramp portion 117, catch member 106 and locking tab 119. As discussed in reference to FIG. 27, if the button 118 is pushed with the ramp portion being deflected inwardly, the locking tab 119 will hit the catch member 106, thereby preventing accidental firing of the embodiment 300.

While one or more embodiments of the present invention have been shown and described herein, such embodiments are provided by way of example only. Variations, changes and substitutions may be made without departing from the invention herein. Accordingly, it is intended that the invention be limited only by the spirit and scope of the appended claims. The teachings of all references cited herein are incorporated in their entirety to the extent not inconsistent with the teachings herein.

What is claimed is:

1. A resettable injection training device, comprising:
   an outer housing comprising a proximal end and a distal end, the outer shell defining a chamber there within;
   a plunger slidable within the chamber, the plunger comprising a plunger feature;
   a safety shield assembly disposed and slidable within the chamber and comprising a proximal end and a distal end, the safety shield assembly comprising an extended locked position, an extended reset position, and a retracted position;
   a locking sleeve disposed at the proximal end of the locking safety shield assembly, the locking sleeve comprising a plunger interacting ramp and plunger interacting groove for interfacing with the plunger feature;
   an actuation assembly comprising a proximal end and a distal end, the actuation assembly comprising an actuator portion at the proximal end and a plunger locking portion at the distal end; and
   an actuation collar disposed at the distal end of the actuation assembly, wherein the actuation collar interacts with the plunger locking portion to hold the plunger in a pre-fired position.

2. The injection training device of claim 1, wherein the actuation assembly comprises a proximal ramp portion and the locking sleeve comprises an actuation releasing portion that interacts with the proximal ramp portion when the safety shield assembly is moved from the extended reset position to the retracted position.

3. The injection training device of claim 1, wherein the plunger comprises a plunger groove and the plunger locking portion comprises a plunger catch that engages with the plunger groove.

4. The injection training device of claim 3, wherein when the safety shield assembly is in the retracted position and the actuator portion is depressed, the plunger catch disengages from the plunger groove thereby firing the plunger to start injection simulation.

5. The injection training device of claim 4, wherein positioning of the plunger locking portion distally to the actuation collar allows disengagement of the plunger catch from the plunger ridge.

6. The injection training device of claim 4, wherein as the plunger moves distally during injection simulation, the locking sleeve rotates as the plunger feature interacts with the plunger interacting ramp.

7. The injection training device of claim 1, wherein following injection simulation, the safety shield assembly is released to assume the extended locked position, and wherein the safety shield assembly is locked out by interaction between the actuation assembly and the locking sleeve.

8. The injection training device of claim 7, wherein the actuation assembly comprises a locking protrusion that interacts with a locking member of the locking sleeve so as to lock the safety shield assembly in the extended locked position.

9. The injection training device of claim 1, wherein the safety shield assembly is converted from the extended locked position to the reset position by application of distal to proximal force on the plunger; and optionally, further comprising a cap having a reset rod associated therewith; wherein the distal to proximal force is applied by insertion of the reset rod into the distal end of the device.

10. The injection training device of claim 9, wherein as the distal to proximal force pushes on the plunger, the plunger moves proximally such that the plunger feature interacts with the plunger interacting feature of the locking sleeve causing rotation of the locking sleeve.

11. The injection training device of claim 10, wherein rotation of the locking sleeve releases the locking sleeve from the locking protrusion of the actuation assembly thereby allowing the locking sleeve and safety shield assembly to move proximally.

12. The injection training device of claim 11, wherein the plunger feature interacts with the plunger interacting groove as the safety shield assembly moves proximally following release of the locking sleeve from the locking protrusion.

13. The injection training device of claim 12, wherein as the plunger feature interacts with the plunger interacting groove, the actuation collar slides over the plunger locking portion and engages the plunger locking portion in the prefired position.

14. The injection training device of claim 13, wherein the actuation collar comprises an actuation reset ramp that interacts with the distal end of the plunger locking portion causing the actuation collar to rotate allowing the actuation reset ramp to course around the plunger locking portion and engage an interacting ridge on an outside surface of the plunger locking portion.

15. The injection training device of claim 14, wherein the actuation collar holds the plunger locking portion against the plunger groove in the pre-fired position.

16. The injection training device of claim 14, wherein as the plunger moves distally and below the plunger locking portion during injection simulation, the actuation collar slides distally below the plunger locking portion.

17. The injection training device of claim 1, wherein the actuation assembly comprises a plurality of plunger locking portions that are axially spaced apart; and wherein, optionally, each of the plunger locking portions comprise a plunger catch portion that interacts with the plunger groove.

18. The injection training device of claim 14, further comprising an actuation collar reset spring that urges rotation of the actuation collar onto the interacting ridge.

19. The injection training device of claim 1, wherein the actuation assembly comprises an actuation spring that applies distally directed force against the plunger.

20. The injection training device of claim 1 further comprising a locking sleeve spring that applies rotational force or distally directed force, or both, to the locking sleeve.

21. A method for resetting an injection training device wherein the injection training device comprises
an outer housing defining a chamber there within;
a plunger slidable within the chamber;
a safety shield assembly disposed and slidable within the chamber and comprising a proximal end and a distal end, the safety shield assembly comprising an extended locked position, an extended reset position, and a retracted position;
a locking sleeve disposed at the proximal end of the safety shield assembly;
an actuation assembly comprising a proximal end and a distal end, the actuation assembly comprising an actuator portion at the proximal end of the actuation assembly and a plunger locking portion at the distal end of the actuation assembly; wherein the method comprises
inserting the elongate rod into the chamber when the safety shield is in an extended locked position; and
applying distal to proximal force to the elongate rod upon insertion thereof to convert the safety shield from an extended locked position to an extended reset position.

* * * * *